(12) United States Patent
Sugiura et al.

(10) Patent No.: US 7,453,548 B2
(45) Date of Patent: Nov. 18, 2008

(54) LIQUID CRYSTAL DISPLAY DEVICE AND METHOD OF MANUFACTURING THE SAME

(75) Inventors: Norio Sugiura, Kawasaki (JP);
Katsufumi Ohmuro, Kawasaki (JP);
Kunihiro Tashiro, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 294 days.

(21) Appl. No.: 11/471,032

(22) Filed: Jun. 20, 2006

(65) Prior Publication Data
US 2006/0238674 A1 Oct. 26, 2006

Related U.S. Application Data

(62) Division of application No. 11/196,703, filed on Aug. 3, 2005, now Pat. No. 7,092,053, which is a division of application No. 10/734,743, filed on Dec. 12, 2003, now Pat. No. 7,098,977.

(51) Int. Cl.
*G02F 1/1368* (2006.01)
*G02F 1/1343* (2006.01)

(52) U.S. Cl. .................. 349/187; 349/43; 349/113; 438/30

(58) Field of Classification Search .............. 349/42, 349/43, 113, 114, 122, 138, 187; 438/30
See application file for complete search history.

(56) References Cited

U.S. PATENT DOCUMENTS 4,519,678 A 5/1985 Komatsubara et al.
4,701,028 A 10/1987 Clerc et al.
5,418,635 A 5/1995 Mitsui et al.
5,847,789 A 12/1998 Nakamura et al.

(Continued)

FOREIGN PATENT DOCUMENTS

| JP | 55-048733 | 4/1980 |
| JP | 57-102680 | 6/1982 |
| JP | 02-236523 | 9/1990 |
| JP | 06-167708 | 6/1994 |
| JP | 9-127501 | 5/1997 |

(Continued)

OTHER PUBLICATIONS

Y. Itoh et al.; "Improvement of the Display Performance of Highly-Reflective TFT-LCD (HR-TFT)"; AM-LCD 2000, pp. 243-244 (2000).
C.J. Wen et al.; "P-1: Optical Properties of Reflective LCD with Diffusive Micro Slant Reflectors (DMSR)"; SID '00 Digest, pp. 526-529 (2000).

*Primary Examiner*—Dung Nguyen
*Assistant Examiner*—Tai Duong
(74) *Attorney, Agent, or Firm*—Greer, Burns & Crain, Ltd.

(57) ABSTRACT

The gate bus lines, the data bus lines, TFTs, etc. are formed on one glass substrate. Also, linear structures arranged in parallel with the gate bus lines are formed simultaneously with any one of the gate bus lines and the data bus lines. Then, a positive resist film is formed over the substrate, and then only a surface layer is cured by irradiating the ultraviolet ray onto the resist film. Then, the annealing is applied to the resist film. Since the linear structures are present under the resist film, a cross section of the resist film is corrugated by the annealing and thus wrinkle-like roughness extending in the almost same direction as the structures are formed on the surface. Then, the reflective electrode is formed on the resist film.

4 Claims, 26 Drawing Sheets

U.S. PATENT DOCUMENTS

| | | |
|---|---|---|
| 6,407,784 B1 | 6/2002 | Kanou et al. |
| 6,452,653 B1 | 9/2002 | Yamanaka et al. |
| 6,532,045 B2 | 3/2003 | Chung et al. |
| 6,839,107 B2 | 1/2005 | Kobashi |
| 6,862,057 B2 | 3/2005 | Sakamoto et al. |
| 6,882,388 B2 | 4/2005 | Sugiura et al. |
| 6,897,922 B2 | 5/2005 | Ikeno et al. |
| 6,943,856 B2 * | 9/2005 | Yamaguchi et al. ........... 349/67 |
| 2002/0158573 A1 | 10/2002 | Kobashi |

FOREIGN PATENT DOCUMENTS

| | | |
|---|---|---|
| JP | 09-292504 | 11/1997 |
| JP | 11-326615 | 11/1999 |
| JP | A 2000-284324 | 10/2000 |
| JP | 2002-221716 | 8/2002 |
| JP | 2002-296585 | 10/2002 |
| JP | A 2002-323705 | 11/2002 |

* cited by examiner voltage not applied voltage applied

|  | liquid crystal | reflective electrode | azimuth | reflectance | contrast |
|---|---|---|---|---|---|
| Example 1 | n type | wrinkle-like | 1 type | 71.2% | 41 |
| Example 2 | n type | wrinkle-like | 3 types | 53.5% | 36 |
| Example 3 | n type | wrinkle-like | 5 types | 33.3% | 43 |
| Example 4 | n type | wrinkle-like | 9 types | 27.0% | 37 |
| Example 5 | p type | wrinkle-like | 1 type | 70.9% | 16 |
| Example 6 | p type | wrinkle-like | 9 types | 28.3% | 17 |
| Comparative Example 1 | n type | random | — | 20.3% | 40 |
| Comparative Example 2 | p type | random | — | 21.2% | 16 | wrinkle-like roughness not formed like the blaze wrinkle-like roughness formed like the blaze

LIQUID CRYSTAL DISPLAY DEVICE AND METHOD OF MANUFACTURING THE SAME

CROSS-REFERENCE TO RELATED APPLICATIONS

This is a divisional of application Ser. No. 11/196,703, filed Aug. 3, 2005, now U.S. Pat. No. 7,092,053, which is a divisional of application Ser. No. 10/734,743, filed Dec. 12, 2003, now U.S. Pat. No. 7,098,977.

This application is based upon and claims priority of Japanese Patent Application No. 2002-365100, filed on Dec. 17, 2002, the contents being incorporated herein by reference.

BACKGROUND OF THE INVENTION

1. Field of the Invention

The present invention relates to a liquid crystal display device having a reflective electrode on a surface of which wrinkle-like fine roughness is provided and a method of manufacturing the same.

2. Description of the Prior Art

As the liquid crystal display device, there are the transmissive liquid crystal display device for displaying the image by controlling a quantity of transmitted light every picture element and the reflective liquid crystal display device for displaying the image by controlling a quantity of reflected light every picture element. The transmissive liquid crystal display device needs a dedicated light source called a backlight, while the reflective liquid crystal display device employs the surrounding light (the sunlight or the electric lamp light) as the light source. Therefore, the reflective liquid crystal display device possesses the advantages of making possible further reduction in thickness, weight, and power consumption and also lessening eye fatigue in the long-time use over the transmissive liquid crystal display device. The reflective liquid crystal display device makes it possible to implement a display such as a paper that is impossible for the transmissive liquid crystal display device to use.

In general, the reflective liquid crystal display device has such a configuration that the TN (Twisted nematic) liquid crystal is sealed in the panel being constructed by a pair of substrates and also the polarization plate is arranged on one surface side of the panel (For example, Patent Application Publication (KOKAI) Sho 55-48733 (Patent Literature 1), Patent Application Publication (KOKAI) Hei 2-236523 (Patent Literature 2), and Patent Application Publication (KOKAI) Hei: 6-167708 (Patent Literature 3)).

FIG. 1 is a schematic sectional view showing the reflective liquid crystal display device of this type. A TN liquid crystal 13 is sealed between a first substrate 11 and a second substrate 14. A transparent plate such as a glass plate is employed at least as the substrate on the display surface side (the second substrate 14). A reflective electrode 12 made of metal or the like is formed on a surface of the first substrate 11 on the liquid crystal 13 side. A transparent electrode 15 made of ITO (Indium-Tin Oxide) or the like is formed on a surface of the second substrate 14 on the liquid crystal 13 side. An alignment film (not shown) for deciding the alignment direction of the liquid crystal molecules when no voltage is applied is formed on surfaces of the reflective electrode 12 and the transparent electrode 15 respectively. A phase plate 16 is arranged on the second substrate 14, and a polarization plate 17 is arranged on the phase plate 16.

FIG. 2A is a schematic view showing the alignment direction of liquid crystal molecules when a voltage is not applied between electrodes in the liquid crystal display device shown in FIG. 1, and FIG. 2B is a schematic view showing the alignment direction of the liquid crystal molecules when the voltage is applied between the electrodes. Although the liquid crystal molecules 13a are aligned between the electrodes 12, 15 while twisting helically in practical use, this twist of the liquid crystal molecules 13a is ignored from FIGS. 2A and 2B.

As shown in FIG. 2A, the liquid crystal molecules 13a are aligned in parallel with the substrates 11, 14 when no voltage is applied between the electrodes 12, 15. Then, liquid crystal molecules 13a tend to align vertically along the electric field when the sufficient voltage is applied between the electrodes 12, 15. However, as shown in FIG. 2B, since the liquid crystal molecules 13a located in vicinity of the substrates 11, 14 still remain in almost parallel with the substrates 11, 14 by the anchoring effect, the liquid crystal molecules 13a located near the substrates 11, 14 have a smaller inclination to the substrates 11, 14 due to the influence of such effect. In this manner, if portions in which the direction of the liquid crystal molecules is not changed even when the voltage is applied are present, the retardation is generated to enhance the luminance in the dark display and thus the contrast characteristic is degraded.

In order to avoid such disadvantages, it has been proposed to design the phase plate while taking account of the residual retardation at the time of voltage application (Y. Itoh, N. Kimura, S. Mizushima, Y. Ishii and M. Hijikigawa, AM-LCD 2000 digest, p. 243 (2000): (Non-Patent Literature 1)). However, even if such design is applied, it is difficult to eliminate the retardation over the full wavelength range.

FIG. 3 is a schematic view showing an example of another liquid crystal display device in the prior art. The liquid crystal display device of this type is called the VA liquid crystal display device because the vertical alignment (VA) liquid crystal is employed. The VA liquid crystal display device is set forth in U.S. Pat. No. 4,701,028 specification: (Patent Literature 4), for example.

In the VA liquid crystal display device, a vertical alignment liquid crystal 23 is sealed between a first substrate 21 and a second substrate 24. A reflective electrode 22 is formed on a surface of the first substrate 21 on the liquid crystal side. A transparent electrode 25 is formed on a surface of the second substrate 24 on the liquid crystal side. Surfaces of the reflective electrode 22 and the transparent electrode 25 are covered with a vertical alignment film (not shown).

Also, a phase plate (¼ wavelength plate) 26 is arranged on the second substrate 24, and a polarization plate 27 is arranged on the phase plate 26.

In the VA liquid crystal display device constructed in this manner, as shown in FIG. 3, liquid crystal molecules 23a are aligned in the direction perpendicular to the substrates 21, 24 in the condition that no voltage is applied between the electrodes 22, 25. As a result, the retardation is not generated at the time of dark display, and thus the contrast characteristic can be improved in contrast to the TN liquid crystal display device shown in FIG. 1.

In the reflective liquid crystal display device, it is commonly practiced to avoid extreme change in lightness of the image due to the location from which the panel is viewed, by providing a fine roughness on the surface of the reflective electrode. For example, in Patent Application Publication (KOKAI) Hei 9-292504 (Patent Literature 5), the technology to generate the roughness on the surface of the reflective electrode at random with a high density has been proposed. The purposes of this are that interference of a light due to the repeating pattern of the roughness is prevented by increasing randomness of the roughness to prevent the change in color of the reflected light and that a rate of flat portions is reduced by increasing a density of the roughness to reduce a specular reflection component.

Also, the applicant of this application has proposed a method of forming wrinkle-like fine roughness on the surface of the reflective electrode via simple steps by using the photoresist (Patent Application Publication (KOKAI) 2002-221716 (Patent Literature 6), and Patent Application Publication (KOKAI) 2002-296585 (Patent Literature 7)). In this method, only a surface layer of the photoresist film is cured by irradiating the ultraviolet ray, or the like onto the photoresist film, and then the annealing is applied to the photoresist film. Accordingly, the wrinkle-like fine roughness is formed due to a difference in the thermal deformation characteristic (thermal expansion coefficient or thermal contraction coefficient) between the surface layer and the deep portion of the photoresist film. Then, the reflective electrode having the fine roughness on the surface is formed by forming a metal film made of aluminum, or the like on the photoresist film and patterning this metal film.

In order to implement the bright display in the reflective liquid crystal display device, it is important to optimize the reflecting surface of the reflective electrode. That is, taking account of the situation of practical use, if the reflecting surface of the reflective electrode is formed to reflect mainly the light incident on the panel from the upper side in the normal direction of the panel, a utilization efficiency of light can be improved and thus the bright image can be obtained.

For example, as shown in FIG. 4A, in Patent Application Publication (KOKAI) Hei 9-127501 (Patent Literature 8), the reflective liquid crystal display device in which a reflective electrode 32 having a blaze (sawtooth)-like reflecting surface and a light scattering body 36 are combined together has been proposed. In this reflective liquid crystal display device, the panel is constructed by sealing a liquid crystal 33 between a pair of substrates 31, 34 and the light scattering body 36 is arranged on the substrate 34 side.

However, in the method set forth in Patent Application Publication (KOKAI) Hei 9-127501, the production process is very complicated because the blaze-like reflecting surface is formed by the transfer by virtue of the die. In addition, since the blaze-like reflecting surface is formed as a specular surface and is combined with the scattering plate, the light is scattered in both cases when the light is incident on the panel and when the light is emitted from the panel, and therefore the image becomes obscured.

In C. J. Wen, D. L. Ting, C. Y. Chen, L. S. Chuang and C. C. Chang, SID'00 digest of technical papers, p. 526 (2000) (Non-Patent Literature 2), the reflective liquid crystal display device in which the roughness is provided on the blaze-like reflecting surface of the reflective electrode, as shown in FIG. 4B, by using the photolithography method has been proposed. According to this method, the roughness is formed on a reflecting surface of a reflective electrode 42 by applying plural times the photolithography step repeatedly. Then, a liquid crystal 43 is sealed between a substrate 41 and a substrate 44.

In Patent Application Publication (KOKAI) Sho 57-102680 (Patent Literature 9), the technology to limit an average inclination angle of the roughness so as to converge the scattered light within a predetermined limited range and thus get the bright display has been proposed. In addition, in Japanese Patent No. 3187369 Specification (Patent Literature 10), the reflective electrode in which the existence rate of the inclination angle in the particular range is increased as the inclination angle is increased has been proposed. Also, the reflective liquid crystal display device in which the uniform brightness can be obtained in the effective viewing angle is disclosed.

(Patent Literature 1)
Patent Application Publication (KOKAI) Sho 55-48733
(Patent Literature 2)
Patent Application Publication (KOKAI) Hei 2-236523
(Patent Literature 3)
Patent Application Publication (KOKAI) Hei 6-167708
(Patent Literature 4)
U.S. Pat. No. 4,701,028
(Patent Literature 5)
Patent Application Publication (KOKAI) Hei 9-292504
(Patent Literature 6)
Patent Application Publication (KOKAI) 2002-221716
(Patent Literature 7)
Patent Application Publication (KOKAI) 2002-296585
(Patent Literature 8)
Patent Application Publication (KOKAI) Hei 9-127501
(Patent Literature 9)
Patent Application Publication (KOKAI) Sho 57-102680
(Patent Literature 10)
Japanese Patent No. 3187369 Specification
(Non-Patent Literature 1)
Y. Itoh, N. Kimura, S. Mizushima, Y. Ishii and M. Hijikigawa, AM-LCD 2000 digest, p. 243 (2000)
(Non-Patent Literature 2)
C. J. Wen, D. L. Ting, C. Y. Chen, L. S. Chuang and C. C. Chang, SID' 00 digest of technical papers, p. 526 (2000)

However, according to above all methods in the prior art, there exist the problems that the step of shaping a reflecting surface of the reflective electrode into a predetermined shape becomes complicated and thus an increase in production cost is brought about.

SUMMARY OF THE INVENTION

It is an object of the present invention to provide a bright liquid crystal display device with good contrast, capable of utilizing effectively surrounding lights and a method of manufacturing the same.

Also, it is another object of the present invention to provide a method of manufacturing the liquid crystal display device, capable of forming easily a blaze-like reflective electrode having fine roughness on its surface.

According to a first aspect of the present invention, there is provided a liquid crystal display device comprising a first substrate; a structure formed on the first substrate to have a linear shape or a shape formed by combining plural straight lines; a resist film formed on the structure, and on a surface of which a wrinkle-like roughness extending in a substantially same direction as the structure is provided; a reflective electrode formed on the resist film and having an roughness that follows the surface of the resist film; a second substrate arranged to oppose to the first substrate; and a liquid crystal sealed between the first substrate and the second substrate.

According to a second aspect of the present invention, there is provided a method of manufacturing a liquid crystal display device comprising the steps of forming a gate bus line, a data bus line, and a thin film transistor connected to the gate bus line and the data bus line on a first substrate respectively; forming a photoresist film on an overall upper surface of the first substrate; curing only a surface layer of the photoresist film; forming a wrinkle-like roughness on a surface of the photoresist film by applying an annealing; forming a reflective electrode, which is connected to the thin film transistor, on the photoresist film; and arranging a second substrate to oppose to the first substrate, and sealing a liquid crystal between the first substrate and the second substrate; wherein a structure having a linear shape or a shape formed by combining a plurality of straight lines is formed simultaneously with any one of the gate bus line and the data bus line.

According to a third aspect of the present invention, there is provided a liquid crystal display device comprising a first substrate; a stepwise structure formed on the first substrate to have a stepwise cross section; a resist film which is formed on the stepwise structure and on a surface of which a wrinkle-like roughness extending in a substantially same direction as the stepwise structure is provided; a reflective electrode formed on the resist film and having an roughness that follows the surface of the resist film; a second substrate arranged to oppose to the first substrate; and a liquid crystal sealed between the first substrate and the second substrate.

According to a fourth aspect of the present invention, there is provided a method of manufacturing a liquid crystal display device comprising the steps of forming a gate bus line, a data bus line, a thin film transistor connected to the gate bus line and the data bus line, and a stepwise structure having a stepwise cross section on a first substrate respectively; forming a photoresist film on an overall upper surface of the first substrate; curing only a surface layer of the photoresist film; forming a wrinkle-like roughness on a surface of the photoresist film by applying an annealing; forming a reflective electrode on the photoresist film; and arranging a second substrate to oppose to the first substrate, and sealing a liquid crystal between the first substrate and the second substrate; wherein at least a part of the stepwise structure is formed simultaneously with at least one of the gate bus line and the data bus line.

According to a fifth aspect of the present invention, there is provided a method of manufacturing a liquid crystal display device comprising the steps of forming a first conductor film on a first substrate, and then forming a gate bus line and a first pattern by patterning the first conductor film; forming a first insulating film on an overall upper surface of the first substrate; forming a semiconductor film acting as an active layer of a thin film transistor on the first insulating film; forming a second conductor film on the first insulating film, and then forming a source electrode and a drain electrode of the thin film transistor, a data bus line connected to the drain electrode, and a second pattern having a width narrower than the first pattern and formed to overlap with the first pattern by patterning the second conductor film; forming a second insulating film on an overall upper surface of the first substrate; forming a photoresist film on the second insulating film; curing only a surface layer of the photoresist film; forming a wrinkle-like roughness on a surface of the photoresist film by applying an annealing; forming a reflective electrode on the photoresist film; and arranging a second substrate to oppose to the first substrate, and then sealing a liquid crystal between the first substrate and the second substrate.

In the present invention, the structure having a linear shape, a shape formed by combining a plurality of straight lines, or a stepwise shape is formed on the substrate. Then, the photoresist for covering the structures is formed on the substrate, then only a surface layer of the photoresist is cured, and then the wrinkle-like roughness is formed on the photoresist by applying the annealing.

The wrinkle-like roughness is formed at random when no structure is provided, whereas the wrinkle-like roughness is formed to extend in the almost same direction as the structure when the structure is provided like the present invention. Therefore, the wrinkle-like roughness pattern can be controlled by the structure. Then, the reflective electrode is formed on the resist film. The wrinkle-like roughness extending in the almost same direction as the structure is also formed on the surface of the reflective electrode, like the surface of the resist film.

That is, in the present invention, the wrinkle-like roughness pattern formed on the surface of the reflective electrode can be controlled by the structure. Therefore, the bright liquid crystal display device with good contrast can be achieved by utilizing effectively the light that is incident from the upper side.

DETAILED DESCRIPTION OF THE PREFERRED EMBODIMENTS

Embodiments of the present invention will be explained with reference to the drawings hereinafter.

First Embodiment

The principle of a first embodiment of the present invention will be explained hereunder.

Figure 1:
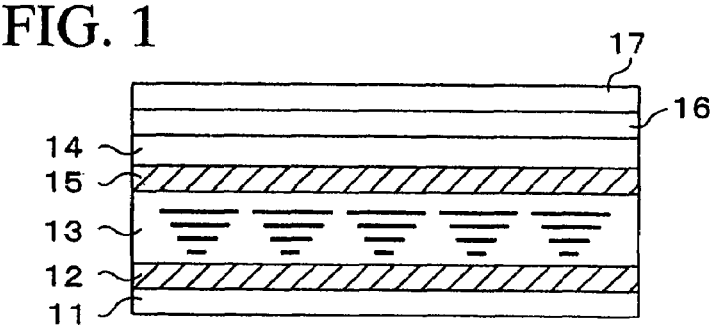
FIG. 1 is a schematic sectional view showing a reflective liquid crystal display device in the prior art.
Figure 2A:
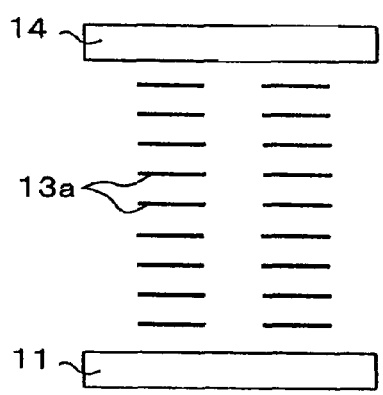
FIG. 2A is a schematic view showing an alignment direction of liquid crystal molecules when a voltage is not applied between electrodes.
Figure 2B:
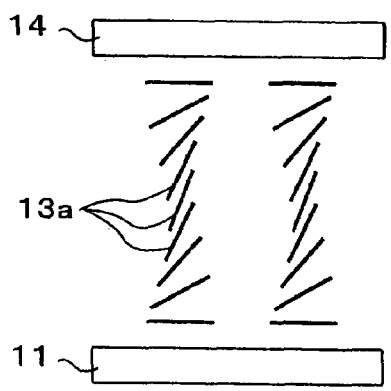
FIG. 2B is a schematic view showing the alignment direction of the liquid crystal molecules when the voltage is applied between the electrodes.
Figure 3:
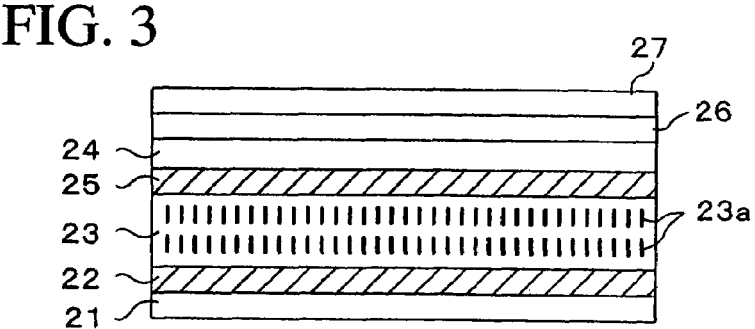
FIG. 3 is a schematic view showing an example of another reflective liquid crystal display device in the prior art.
Figure 4A:
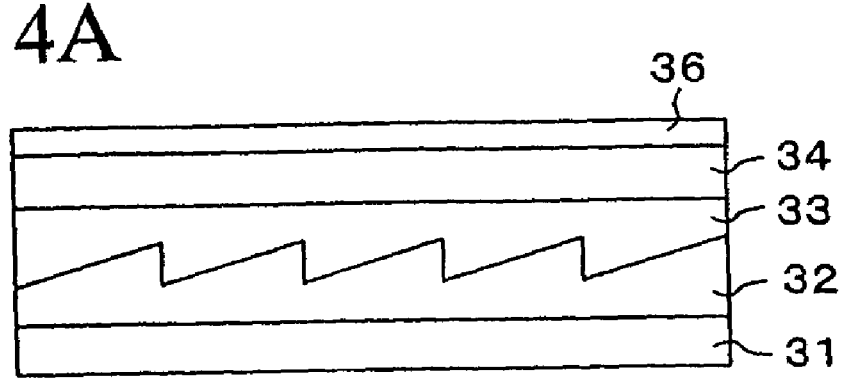
FIG. 4A is a schematic view showing an example of a reflective liquid crystal display device having a blaze-like reflective electrode.
Figure 4B:
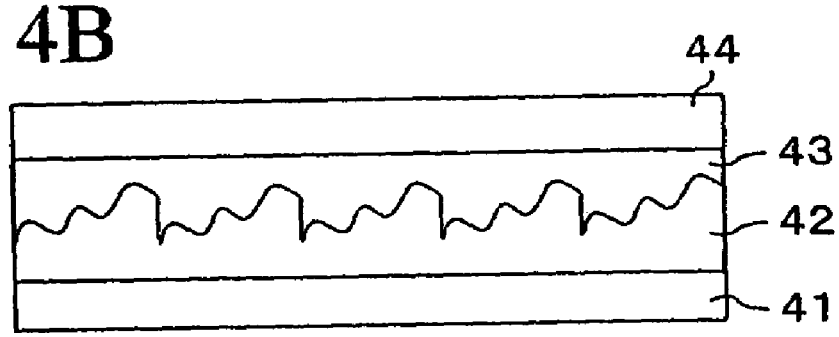
FIG. 4B is a schematic view showing another example of the reflective liquid crystal display device having the blaze-like reflective electrode.
Figure 5:
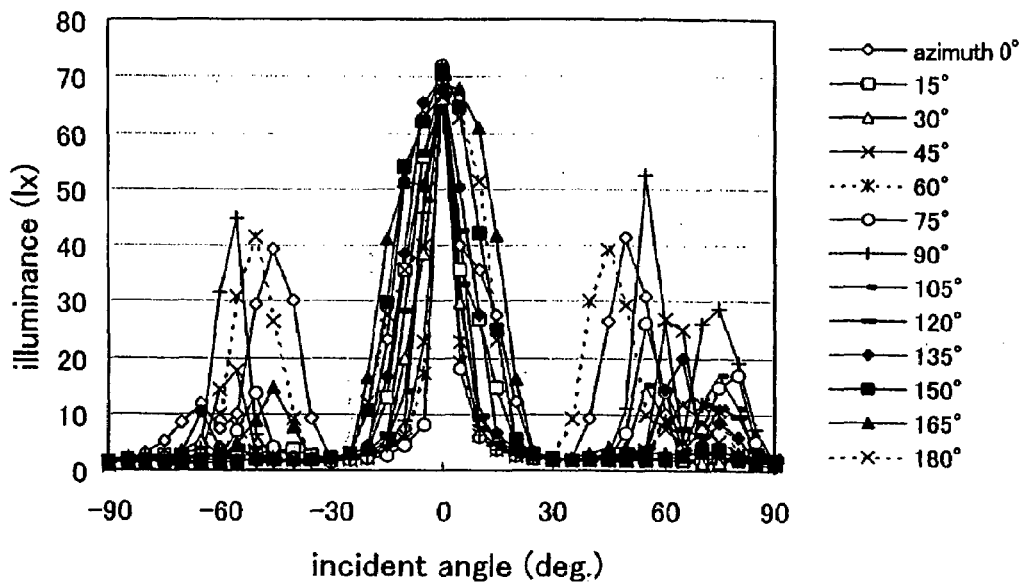
FIG. 5 is a graph showing measured results of a light source distribution in the Office.

The inventors of this application supposed such a situation where the liquid crystal display device is used in the Office, and then measured a light source distribution in the Office. The results are shown in FIG. 5. It should be noted in FIG. 5 that a vertical direction is used as reference direction (incident angle of 0) of incident angle, and a predetermined azimuth lying in a horizontal plane is used as a reference direction (azimuth 0) of an azimuth.

It can be understood from this FIG. 5 that one light source incident at an incident angle (incident cone angle) of 30 or less and a plurality of light sources incident at an incident angle in excess of 30 are present in the Office. As the result derived by computing both energies, it was found that the former has about 2.5 times a larger energy than the latter. Therefore, it is preferable that, in order to get the bright image, the reflective electrode of the liquid crystal display device should be optimized to utilize effectively the light that has the incident angle of 30 or less.

Figure 6:
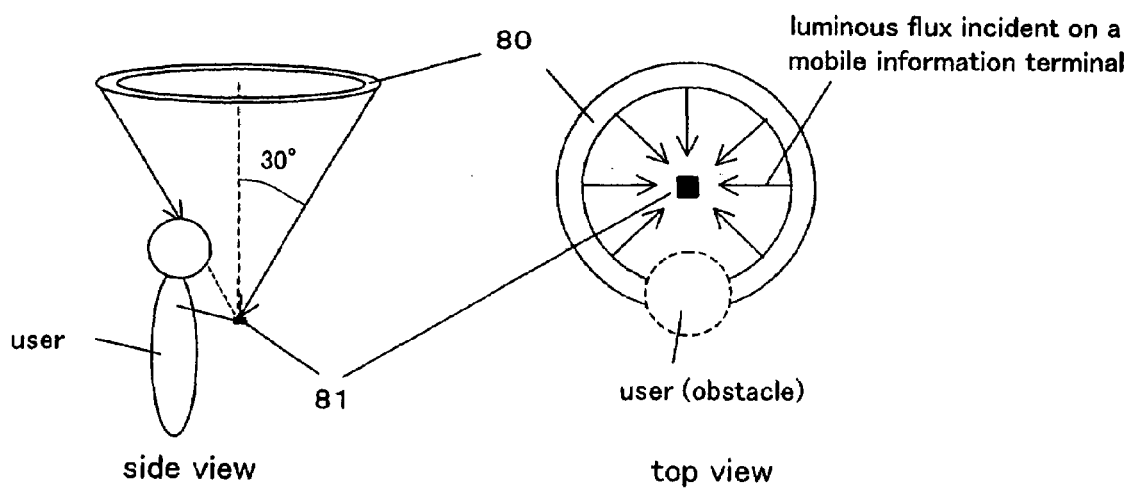
FIG. 6 is a schematic view showing a situation in which the user utilizes the mobile information terminal.

When a small-sized device such as a cellular phone, a PDA (Personal Digital Assistant), or the like (referred simply to as a "mobile information terminal" hereinafter) is used, the using situation shown in FIG. 6 is supposed. In FIG. 6, it is assumed that the light is incident on a mobile information terminal 81 from a ring-like light source 80 that has an incident cone angle of 30. In this case, because the mobile information terminal 81 is smaller in size than the user (person), such user constitutes the obstacle and thus the light being input along the direction in which the user is present is not incident on the mobile information terminal 81. Therefore, it is important to optimize the lights that are input in the direction in which the user is not present.

Figure 7:
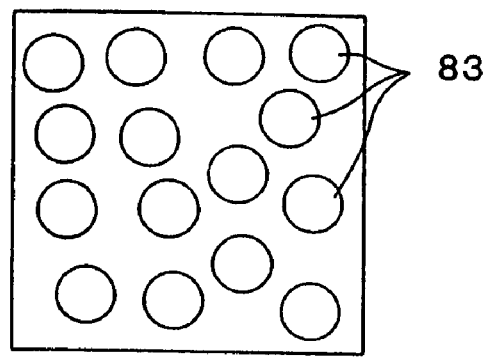
FIG. 7 is a schematic view showing uneven patterns formed on a surface of the reflective electrode in terms of an equivalent circular pattern in the prior art.

In the conventional liquid crystal display device in which roughness is provided at random on the surface of the reflective electrode, as shown in FIG. 7, a pattern of an roughness 83 may be regarded as a circular pattern. In this case, a rate of the light, which goes to the direction of the user's eye, to all the lights that are reflected by the reflective electrode is small.

Figure 8A:
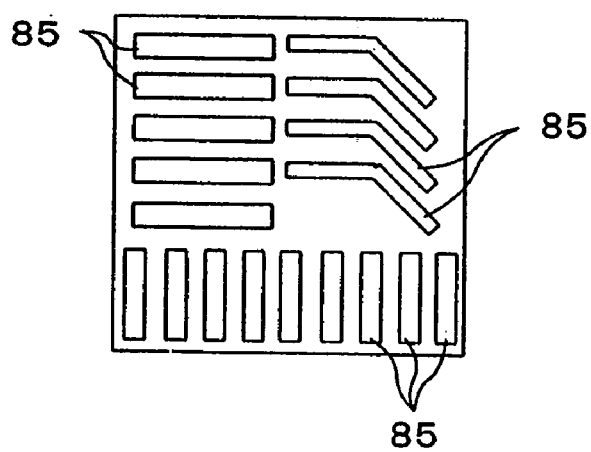
FIG. 8A is a plan view showing an example of a structure.
Figure 8B:
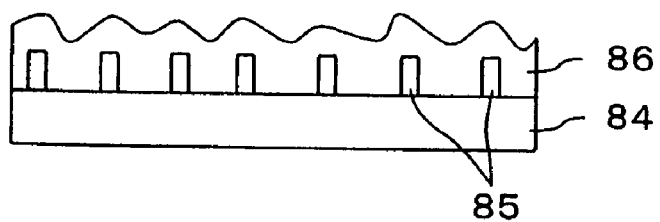
FIG. 8B is a sectional view showing the structure and roughness formed on a resist film formed thereon.

In contrast, in the present embodiment, for example, as shown in a plan view of FIG. 8A and a sectional view of FIG. 8B, structures 85 each having a linear shape (a straight line extending in the horizontal direction, a straight line extending in the vertical direction, and a straight line extending in some other direction) or a shape consisting of a combination of two straight lines or more are formed on a substrate 84, then a photoresist film 86 is formed thereon, and then wrinkle-like roughness is formed on a surface of the photoresist film 86 by applying the annealing to the structure. According to this method, the wrinkle-like rough ness extending in the almost same direction as the structures 85 is formed. Thus, the roughness having the same pattern as the photoresist film 86 is formed on the reflective electrode formed on the photoresist film 86. If the wrinkle-like roughness pattern is controlled in this manner, a rate of the light that is directed to the direction of the user's eye to all the lights that are reflected by the reflective electrode can be increased, so that the light irradiated from the upper side can be utilized effectively.

Figure 9A:
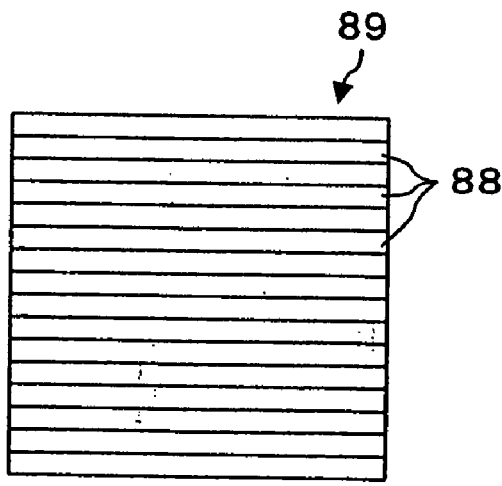
FIG. 9A is a plan view showing a shape of the reflective electrode used in a simulation of a reflecting characteristic.
Figure 9B:
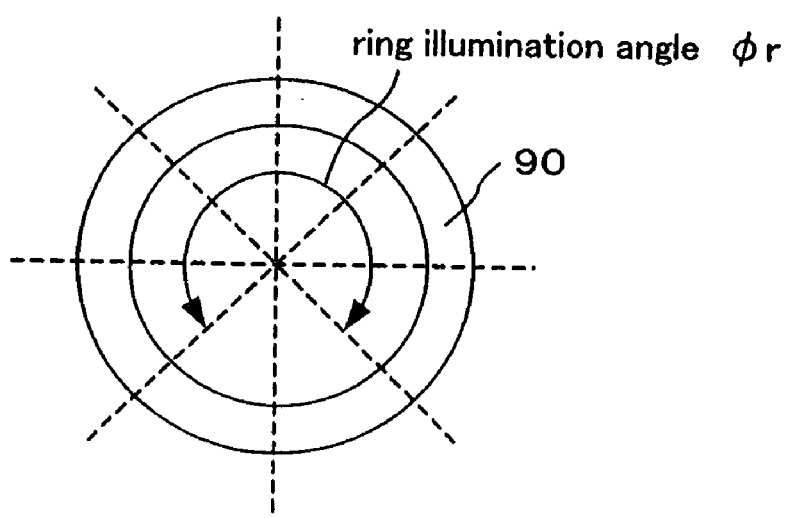
FIG. 9B is a plan view showing a light source used in the simulation of the reflecting characteristic.

A reflecting characteristic was obtained by simulation for the case where the light is incident on a reflective electrode 89 on which linear roughness 88 is provided, as shown in FIG. 9A, from a ring-like light source 90 whose incident cone angle is 30 and whose ring illumination angle is $\phi$ r, as shown in FIG. 9B.s In this simulation, it is assumed that linear roughness having the azimuth of n types (where n is an odd number from 1 to 19) is provided on the reflective electrode 89. More particularly, the azimuth of the roughness is one type of 0 at n=1, the azimuth of the roughness is three types of 0 and ±10 at n=3, and the azimuth of the roughness is five types of 0, ±10, and ±20 at n=5. Showing by general formula, there is n type of azimuth of the roughness such as 0, ±10, ..., and ±5(n−1), when n is adopted.

Figure 10:
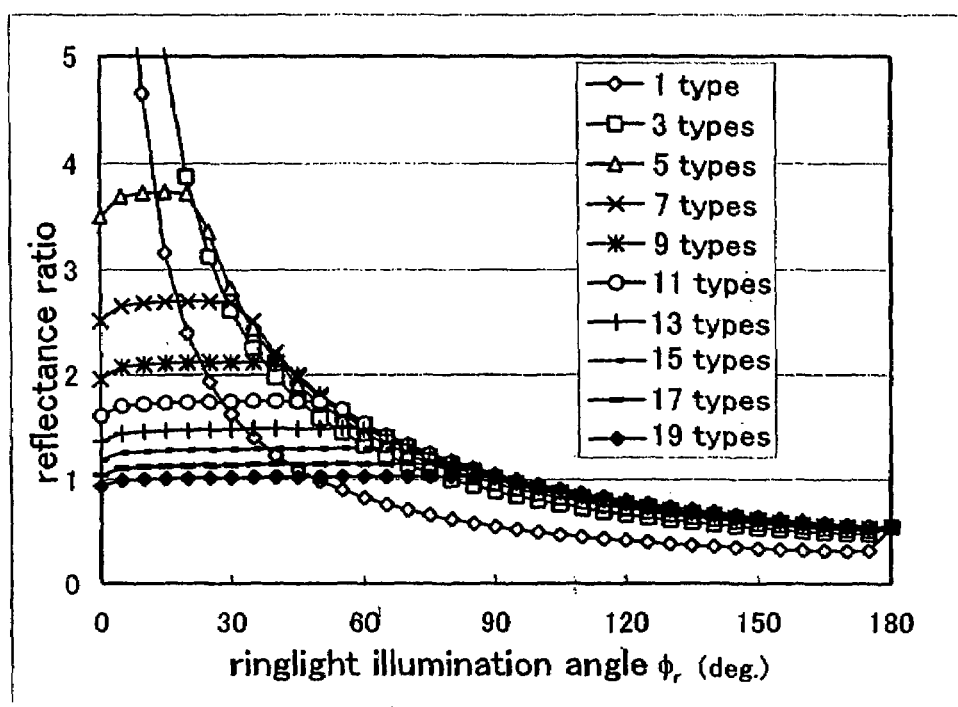
FIG. 10 is a graph showing results of the simulation of the reflecting characteristic.

The results of the simulation of the reflecting characteristic are shown in FIG. 10. In this case, the reflectance of the random roughness (corresponding to the prior art) is set to 1, and then respective reflectances are given in FIG. 10 in comparison with this reflectance.

As can be appreciated from FIG. 10, the maximum reflectance is lowered as the type of the azimuth is increased. Also, the reflectance is lowered as an illumination angle φ r of the ring-like light source is increased. Assuming that the ring illumination angle φ r of the environment in which the liquid crystal display device is used is set to 40 or less, linear roughness, whose azimuth is 9 types or less, may be formed to get the twice reflectance or more in contrast to the prior art.

As described above, since the light source can be considered as a ring-like shape in the practical use, azimuths of the roughness on the reflective electrode is uniformed. As a result, the definition of the azimuth of the roughness is not required and, in the case of the structure that is constructed by combining a plurality of straight lines, the reflecting characteristic is decided only by the number of azimuths of the roughness.

Next, a structure of the liquid crystal display device according to the first embodiment will be explained hereunder.

Figure 11:
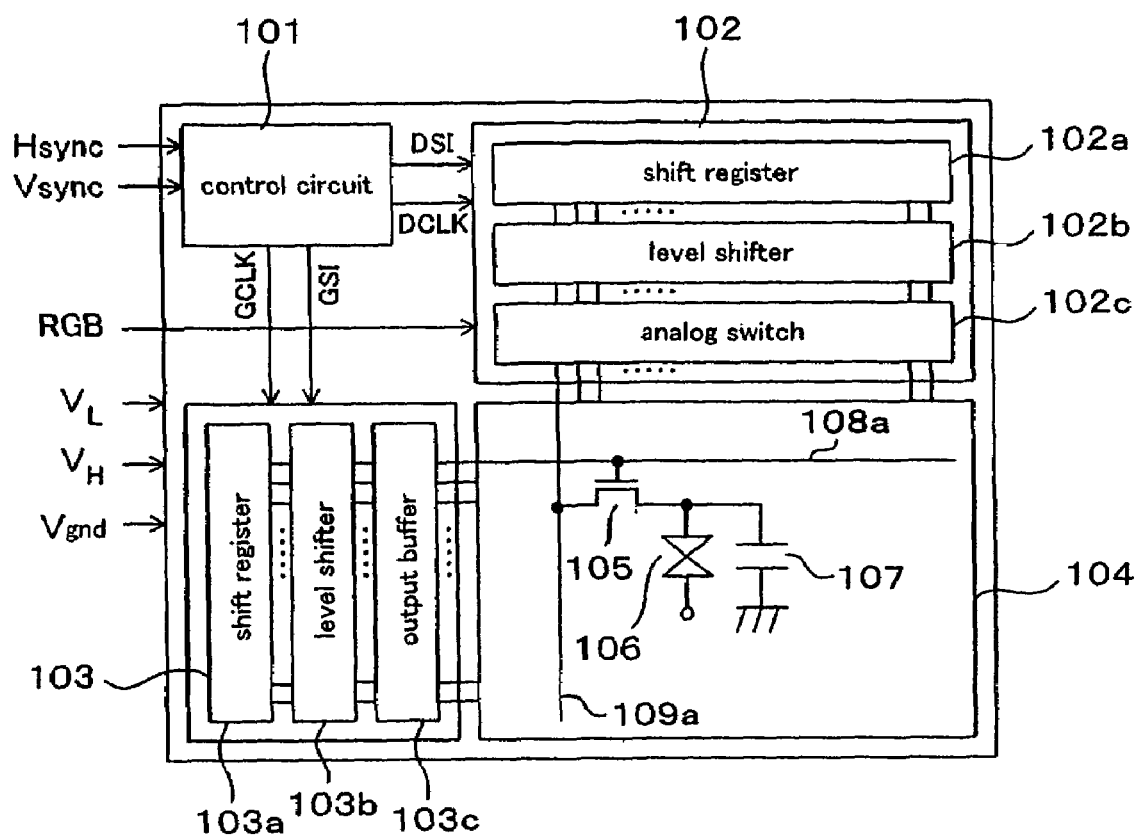
FIG. 11 is a block diagram showing a liquid crystal display device according to a first embodiment of the present invention.

FIG. 11 is a block diagram showing a liquid crystal display device according to the first embodiment of the present invention. This liquid crystal display device comprises a control circuit 101, a data driver 102, a gate driver 103, and a display portion 104. Signals such as display signals (R (red) signal, G (green) signal, and B (blue) signal), a horizontal synchronizing signal Hsync and a vertical synchronizing signal Vsync, etc. are supplied to the liquid crystal display device from external apparatuses (not shown) such as a computer, etc., and also a high voltage (e.g., 18 V) VH, a low voltage (e.g., 3 V or 5 V) VL, and a ground potential Vgnd are supplied.

A number of sub-pixels are aligned on the display portion 104 in the horizontal direction and the vertical direction. One picture element consists of a TFT 105, and a display cell 106 and a storage capacitor 107 connected to a source electrode of the TFT 105. The display cell 106 consists of a pair of electrodes (a reflective electrode and a common electrode) and a liquid crystal sealed between these electrodes. As described later, a phase plate and a polarization plate are arranged on the display portion 104.

Also, a plurality of gate bus lines 108a extending in the horizontal direction and a plurality of data bus lines 109a extending in the vertical direction are provided on the display portion 104. Gate electrodes of respective TFTs 105 of the picture elements aligned in the horizontal direction are connected to the identical gate bus line 108a. Drain electrodes of respective TFTs 105 of the picture elements aligned in the vertical direction are connected to the identical data bus line 109a.

The control circuit 101 inputs the horizontal synchronizing signal Hsync and the vertical synchronizing signal Vsync, and outputs a data start signal DSI that becomes active at the time of start of one horizontal synchronization period, a data clock DCLK that divides one horizontal synchronization period into predetermined intervals, a gate start signal GSI that becomes active at the time of start of one vertical synchronization period, and a gate clock GCLK that divides one vertical synchronization period into predetermined intervals.

The data driver 102 consists of a shift register 102a, a level shifter 102b, and an analog switch 102c. The shift register 102a has a plurality of output terminals. This shift register 102a is initialized by the data start signal DSI, and outputs sequentially a low-voltage active signal from respective output terminals at a timing that is in synchronism with the data clock DCLK.

The level shifter 102b has a plurality of input terminals and a plurality of output terminals. Then, the level shifter 102b converts the low-voltage active signal being output from the shift register 102a into a high-voltage signal and then outputs it.

The analog switch 102c has also a plurality of input terminals and a plurality of output terminals. Output terminals of the analog switch 102c are connected to corresponding data bus lines 109a respectively. The analog switch 102c, when receives the active signal from the level shifter 102b, outputs the display signal (any one of the R signal, the G signal, and the B signal) to the output terminal corresponding to the input terminal to which the active signal is input.

In other words, the data driver 102 outputs sequentially the display signals (the R signal, the G signal, and the B signal) to the data bus lines 109a of the display portion 104 in one horizontal synchronization period at a timing that is in synchronism with the data clock DCLK.

The gate driver 103 consists of a shift register 103a, a level shifter 103b, and an output buffer 103c.

The shift register 103a has a plurality of output terminals. This shift register 103a is initialized by the gate start signal GSI and outputs a low-voltage scanning signal from respective output terminals at a timing that is in synchronism with the gate clock GCLK.

The level shifter 103b has a plurality of input terminals and a plurality of output terminals. Then, the level shifter 103b converts the low-voltage scanning signal being input from the shift register 103a into a high-voltage signal and then outputs it.

The output buffer 103c has also a plurality of input terminals and a plurality of output terminals. Output terminals of the output buffer 103c are connected to corresponding gate bus lines 108a respectively. The output buffer 103c supplies the scanning signal being input from the level shifter 103b to the gate bus: line 108a via the output terminal that corresponds to the input terminal.

In other words, the gate driver 103 supplies sequentially the scanning signal to the gate bus lines 108a of the display portion 104 in one vertical synchronization period at a timing that is in synchronism with the gate clock GCLK.

When the scanning signal is supplied to the gate bus line 108a, the TFT 105 of the display portion 104 is turned ON. At this time, when the display signal (any one of the R signal, the G signal, and the B signal) is supplied to the data bus line 109a, such display signal is written into the display cell 106 and the storage capacitor 107. An inclination of the liquid crystal molecules is changed by the loaded display signal in the display cell 106, and as a result a light reflectance of the display cell 106 is changed. A desired image is displayed by controlling the light reflectance of the display cell 106 every picture element.

Figure 12:
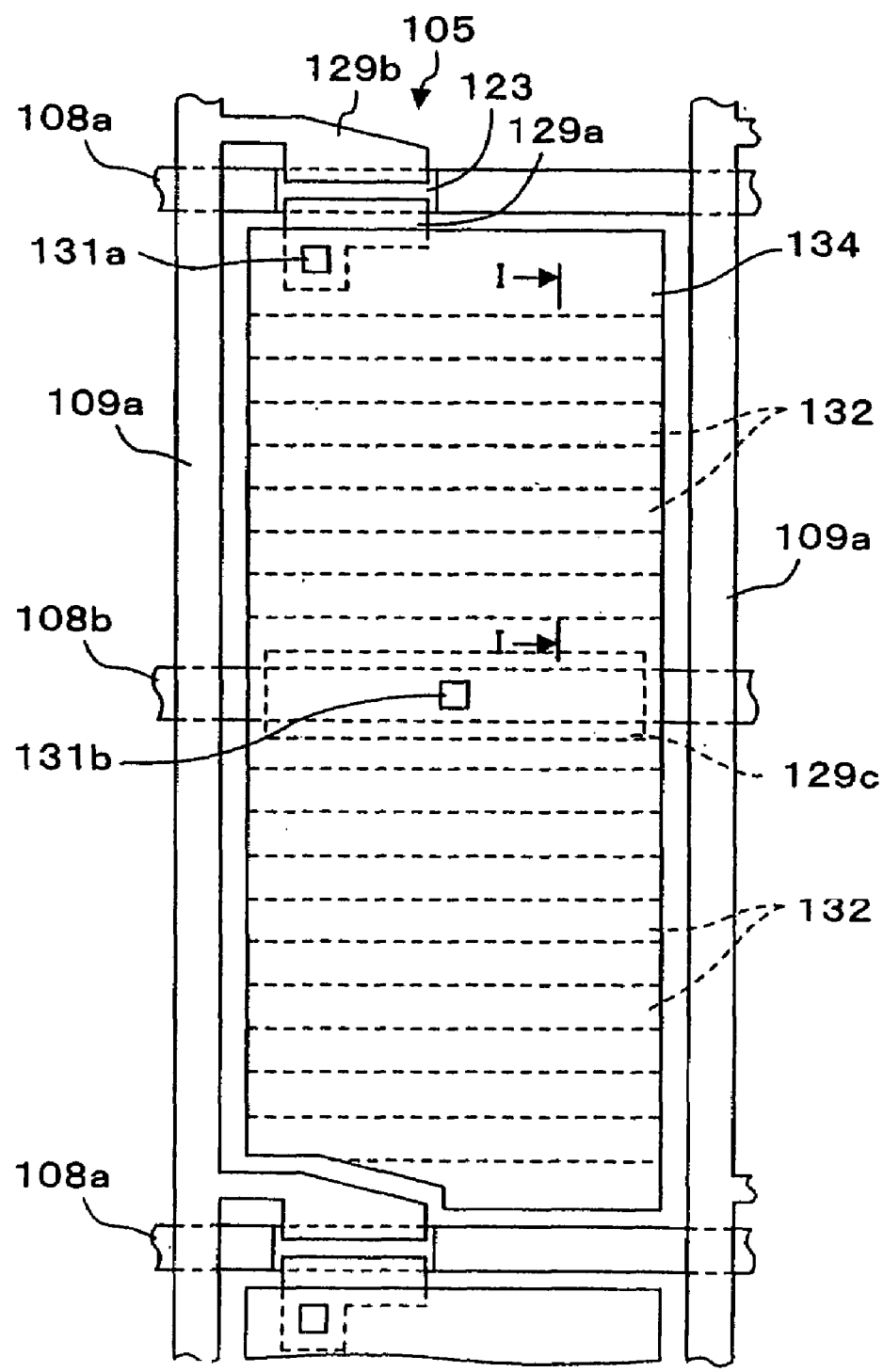
FIG. 12 is a plan view showing one picture element of the reflective liquid crystal display device according to the first embodiment.

FIG. 12 is a plan view showing one picture element of the reflective liquid crystal display device according to the above present embodiment.

Figure 13:
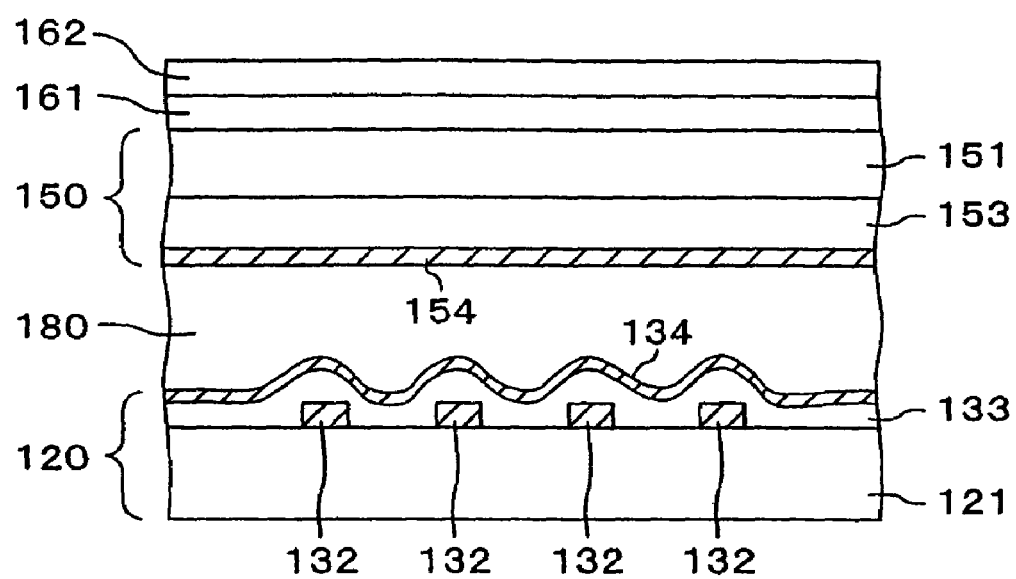
FIG. 13 is a sectional view taken along a I-I line in FIG. 12.

FIG. 13 is a sectional view taken along a I-I line in FIG. 12.

As shown in FIG. 13, the liquid crystal display device according to the present embodiment is constructed to include a TFT substrate 120 and an opposing substrate 150 arranged to oppose to each other, a liquid crystal 180 sealed between the TFT substrate 120 and the opposing substrate 150, and a phase plate 161 and a polarization plate 162 arranged on the opposing substrate 150.

As shown in FIG. 12 and FIG. 13, the TFT substrate 120 is composed of a glass substrate 121, and the gate bus lines 108a, storage capacitance bus lines 108b, the data bus lines 109a, the TFTs 105, storage capacitance electrodes 129c, reflective electrodes 134, etc., which are formed on the glass substrate 121.

A gate insulating film (not shown) is formed between the gate bus lines 108a and the data bus lines 109a. The gate bus lines 108a and the data bus lines 109a are electrically isolated by this gate insulating film.

Also, a plurality of linear structures 132 extending in the same direction as the gate bus lines 108a are formed on the same wiring layer as the data bus lines 109a. An insulating film (not shown) made of SiN is formed on the gate bus lines 108a, the data bus lines 109a, the linear structures 132, and the TFTs 105. A resist film 133 is formed on this insulating film. As shown in FIG. 13, a sectional shape of the resist film 133 is corrugated due to the presence of the linear structures 132, and wrinkle-like fine roughness extending in the almost same direction as the linear structures 132 is provided on a surface of the resist film 133.

The reflective electrode 134 is formed on the resist film 133. The reflective electrode 134 is corrugated like the resist film 133, and the wrinkle-like roughness extending in the almost same direction as the linear structures 132 is provided on a surface thereof.

The storage capacitance bus lines 108b are formed in parallel with the gate bus lines 108a on the same wiring layer as the gate bus lines 108a and the linear structures 132. The storage capacitance electrodes 129c are formed on the storage capacitance bus lines 108b via the above gate insulating film. The storage capacitance electrode 129c, the storage capacitance bus line 108b, and the gate insulating film formed therebetween constitute the storage capacitor 107 shown in FIG. 11. The storage capacitance electrode 129c is connected electrically to the reflective electrode 134 via a contact hole 131b.

In addition, in the present embodiment, as shown in FIG. 12, a part of the gate bus line 108a serves as a gate electrode of the TFT 105, a source electrode 129a is connected electrically to the reflective electrode 134 via a contact hole 131a, and a drain electrode 129b is connected electrically to the data bus line 109a. Further, an alignment film (not shown) for deciding the alignment direction of the liquid crystal molecules when no electric filed is applied is formed on the reflective electrode 134.

Meanwhile, the opposing substrate 150 consists of a glass substrate (transparent substrate) 151, and a black matrix (not shown), a color filter 153, and a common electrode 154, which are formed on one surface side (lower side in FIG. 13) of this glass substrate 151. Any one color out of the red color, the green color, and the blue color is arranged as the color filter 153 every picture element. In addition, the common electrode 154 is formed under the color filter 153, and then an alignment film (not shown) is formed under the common electrode 154.

The TFT substrate 120 and the opposing substrate 150 are arranged such that their surfaces on which the alignment film is formed are opposed to each other. The TFT substrate 120 and the opposing substrate 150 as well as the liquid crystal 180 being sealed in a space between both substrates constitute the liquid crystal display panel. In this case, the control circuit 101, the data driver 102, and the gate driver 103 may be formed integrally with the liquid crystal display panel, otherwise these circuits may be formed on some other substrate and then connected electrically to the liquid crystal display panel via a flexible substrate, or the like.

Next, a method of manufacturing the reflective liquid crystal display devise according to the present embodiment will be explained hereunder.

At first, a method of manufacturing the TFT substrate 120 will be explained with reference to a plan view of FIG. 12 and sectional views of FIGS. 14A to 14D hereunder. It should be noted that FIGS. 14A to 14D are sectional views showing the method of manufacturing the reflective liquid crystal display device in order of steps, which correspond to cross sections taken along a I-I line in FIG. 12.

Figure 14A:
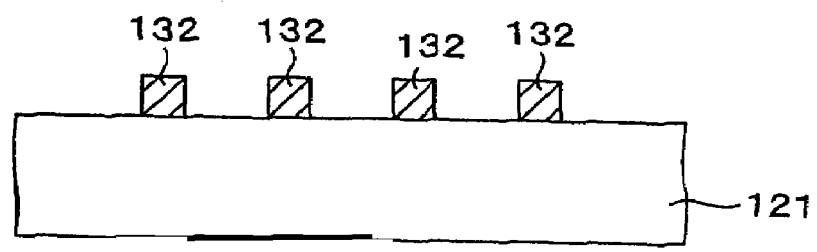
FIGS. 14A to 14D are sectional views showing a method of manufacturing the reflective liquid crystal display device according to the first embodiment.

First, as shown in FIG. 14A, a first metal film is formed on the glass substrate 121 by the PVD (Physical Vapor Deposition) method, and then the first metal film is patterned by the photolithography method. Thus, the gate bus lines 108a, the linear structures 132, and the storage capacitance bus lines 108b are formed. Then, the gate insulating film is formed on the overall upper surface of the glass substrate 121, and then the first silicon film acting as the active layer of the TFT 105 and the SiN film acting as the channel protection film 123 are formed % thereon. Then, the channel protection film 123 is formed in a predetermined area over the gate bus line 108a by patterning the SiN film by virtue of the photolithography method.

Then, the second silicon film into which an impurity is introduced at a high concentration to act as an ohmic contact layer is formed on the overall upper surface of the glass substrate 121, and then the second metal film is formed on the second silicon film. Then, the second metal film, the second silicon film, and the first silicon film are patterned by the photolithography method. Thus, the shape of the first silicon film serving as the active layer of the TFT 105 is defined, and also the data bus lines 109a, the source electrodes 129a, the drain electrodes 129b, and the storage capacitance electrodes 129c are formed.

Then, the SiN insulating film (not shown) is formed on the overall upper surface of the glass substrate 121, and opening portions from which the source electrode 129a the storage capacitance electrode 129c are exposed are formed at predetermined positions of the SiN insulating film.

Figure 14B:
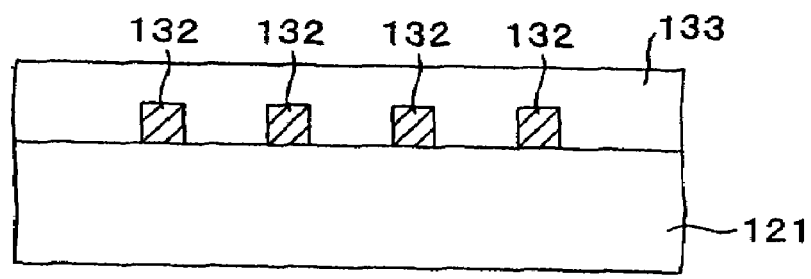

Then, as shown in FIG. 14B, Novolak positive photoresist of about 3 μm thickness is coated on the overall upper surface of the glass substrate 121 to form the resist film 133, and then such resist film 133 is pre-baked at the temperature of 90° C. for 30 minutes. Then, the contact holes 131a, 131b reaching the source electrode 129a and the storage capacitance electrode 129c from the surface of the resist film 133 via the opening portions in the SiN insulating film are formed by applying the exposing and developing processes.

Then, the resist film 133 is post-baked at the temperature of 135° C. for 80 minutes. Then, only a surface layer of the resist film 133 is cured by irradiating the ultraviolet ray (UV) at an energy of 2600 mJ/cm$^2$, for example.

Figure 14C:
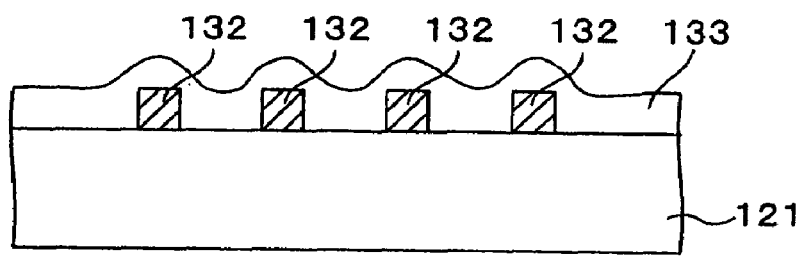

Then, the annealing is carried out at the temperature of 215° C. for 60 minutes. Thus, as shown in FIG. 14C, the wave-like roughness following the linear structures 132 is formed on the surface of the resist film 133, and also the wrinkle-like fine roughness extending in the same direction as the linear structures 132 is formed thereon.

Figure 14D:
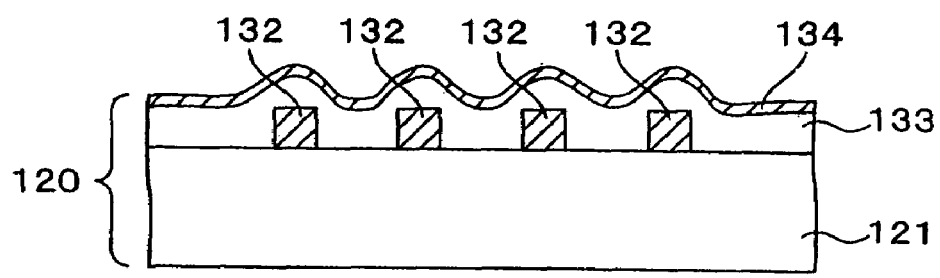

Then, the metal film is formed by depositing aluminum on the overall upper surface of the glass substrate 121 by virtue of the vacuum deposition method to have a thickness of 2000. Then, as shown in FIG. 14D, the reflective electrode 134 is formed by patterning the metal film by virtue of the photolithography method. Then, the alignment film is formed on the reflective electrode 134. In this manner, the TFT substrate 120 of the liquid crystal display device according to the present embodiment is completed.

Next, a method of manufacturing the opposing substrate 150 will be explained briefly hereunder. First, the metal film such as Cr (chromium), or the like is formed on the glass substrate 151 and then this metal film is patterned. Thus, the black matrix for shielding regions between the picture elements and TFT forming regions from the light is formed. Then, the color filter 153 is formed on the glass substrate 151. As the color filter 153, any one color out of the red color (R), the green color (G), and the blue color (B) is arranged every picture element.

Then, the common electrode 154 made of transparent conductor such as ITO, or the like is formed on the color filter 153. Then, the alignment film made of polyimide, or the like is formed on the common electrode 154. In this fashion, the opposing substrate 150 is completed.

Then, as shown in FIG. 13, the panel is constructed by arranging the TFT substrate 120 and the opposing substrate 150 to put spacers (not shown) therebetween and then sealing the liquid crystal 180 between them. Then, the phase plate 161 and the polarization plate 162 are arranged on the panel. Accordingly, the reflective liquid crystal display device according to the present embodiment is completed.

Figure 15:
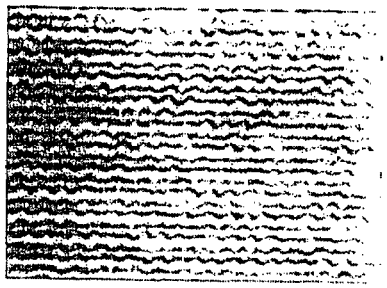
FIG. 15 is a view showing a microphotographic picture (of 20 magnifications) of a surface of the reflective electrode formed by the method in the first embodiment.

FIG. 15 is a microphotographic picture (of 20 magnifications) of the surface of the reflective electrode that is formed by the above method. It can be confirmed from FIG. 15 that the wrinkle-like fine roughness extending in the almost same direction as the linear structures is formed on the surface of the reflective electrode.

Figure 16:
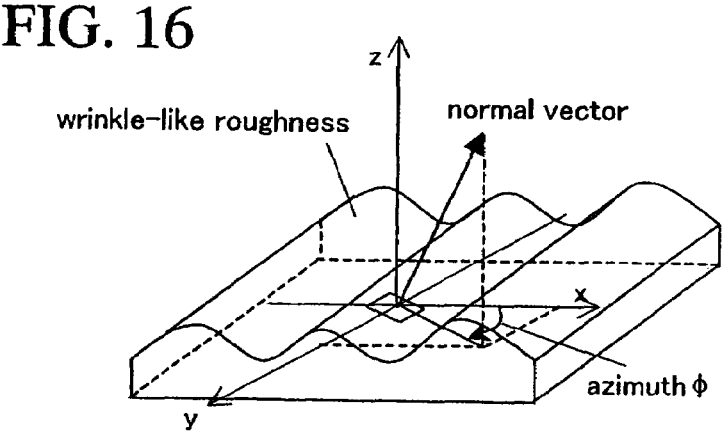
FIG. 16 is a schematic view showing an azimuth face of a wrinkle-like roughness.

Then, distribution of an azimuth angle on the surface of the roughness is examined by measuring the surface shape of the wrinkle-like roughness by means of AFM (Atomic Force Microscopic). That is, as shown in FIG. 16, an infinitesimal mirror surface is supposed on the surface of the wrinkle-like roughness, and then an azimuth angle distribution of a normal vector on the infinitesimal mirror surface is computed. Simulated results are given in a graph of FIG. 17.

Figure 17:
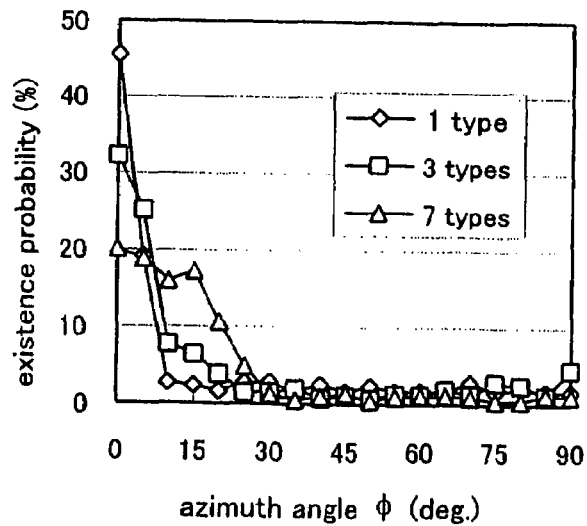
FIG. 17 is a graph showing simulated results of an existence probability distribution in an azimuth angle direction.

As can be seen from FIG. 17, an existence probability in the 0 direction (equivalent to the vertical direction) becomes maximum. This indicates that the wrinkle-like roughness extends in the horizontal direction (lateral direction) of the liquic crystal display panel. In this case, in FIG. 17 are given relationships between an azimuth angle $\phi$ and an existence probability derived in case that the azimuth of the linear structure is 1 type (the case that only the linear structure formed in parallel with the gate bus line is provided), and in cases that the azimuths of the linear structure are 3 types and 7 types respectively (the case that the structure constructed by three type straight lines whose azimuths are different mutually is provided, and the case that the structure constructed by seven type straight lines whose azimuths are different mutually is provided).

The liquid crystal display panels in Examples 1 to 6 were manufactured by using the substrate having such reflective electrode. In the liquid crystal display panels in Examples 1 to 4, the vertical alignment (n type) liquid crystal whose refractive anisotropy $\Delta n$ is 0.1 ($\Delta n$=0.1) was sealed between two substrates. A cell thickness was 3 µm, and a twist angle was 0. Also, in the liquid crystal display panels in Examples 5, 6, the horizontal alignment (p type) liquid crystal whose refractive anisotropy $\Delta n$ is 0.068 ($\Delta n$=0.068) was sealed between two substrates. A cell thickness was 3 µm, and a twist angle was 70.

Also, the liquid crystal display panels in Comparative Examples 1, 2 were manufactured by the similar way to Examples 1 to 6 except that no linear structure is constructed. In the liquid crystal display panel in Comparative Example 1, the vertical alignment (n type) liquid crystal whose refractive anisotropy $\Delta n$ is 0.1 ($\Delta n$=0.1) was sealed between two substrates. A cell thickness was 3 µm, and a twist angle was 0. In the liquid crystal display panel in Comparative Example 2, the horizontal alignment (p type) liquid crystal whose refractive anisotropy $\Delta n$ is 0.068 ($\Delta n$=0.068) was sealed between two substrates. A cell thickness was 3 µm, and a twist angle was 70. In the liquid crystal display panels in Comparative Examples 1, 2, the roughness was formed at random.

Figures 18, 19:
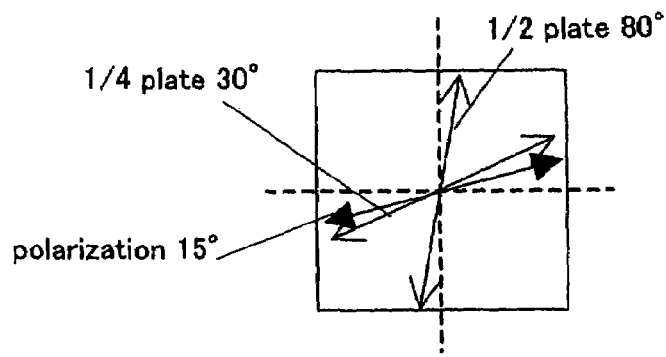
FIG. 18 is a schematic view showing arrangement states of a phase plate and a polarization plate.
FIG. 19 is a table showing measured results of a reflectance and a contrast of panels in Examples and Comparative Examples.

On the liquid crystal display panel in Examples 1 to 6 and Comparative Examples 1, 2, a wideband ¼ wavelength plate constructed by combining a ½ plate and a ¼ plate (manufactured by Sumitomo Chemical. Co., Ltd.) made of Arton respectively was arranged, and then a polarization plate (G1220DU: manufactured by Nitto Denko Corporation) whose axial angle is set as shown in FIG. 18 was arranged thereon. Then, the reflectance and the contrast of the panels were measured. Measured results are shown in FIG. 19.

As apparent from FIG. 19, in the liquid crystal display panels in Examples 1 to 6 of the present embodiment, the reflectance was higher than that in Comparative Examples 1, 2 and the reflecting characteristic was excellent. In particular, in the panels using the n type liquid crystal in Examples 1 to 4, the contrast characteristic was also excellent. On the contrary, in Comparative Example 1, the contrast characteristic was good but the reflectance had the lowest value. Also, in Comparative Example 2, both the reflectance and the contrast characteristic were not satisfactory.

The liquid crystal display device into which such liquid crystal display panel is incorporated was employed in the Office, and the visibility was checked. As a result, it was confirmed that, when the wrinkle-like roughness extending in the vertical direction or the horizontal direction is formed like the present embodiment, the bright display can be obtained. When the wrinkle-like roughness extending in the vertical direction was formed, the light incident from the overhead side in the lateral direction could be used effectively. When the wrinkle-like roughness extending in the horizontal direction was formed, the light incident from the overhead side in the front direction could be used effectively.

In the Office, etc., light sources such as fluorescent lamps, or the like are aligned linearly at a predetermined interval. Therefore, if the wrinkle-like roughness is formed like the present embodiment, the light incident from the light source could be used effectively and thus the bright liquid crystal display device with good contrast can be implemented.

Figure 20:
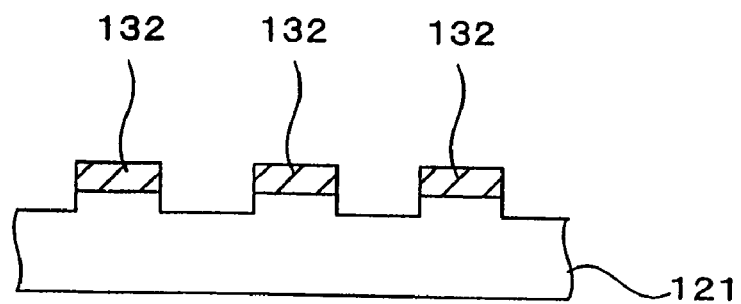
FIG. 20 is a sectional view showing an example in which a groove is formed between linear structures.

In this case, as shown in FIG. 20, if grooves are formed by etching the glass substrate 121 between the linear structures 132, a substantial height of the linear structure 132 is increased and pattern controllability of the wrinkle-like roughness is improved.

Figure 21:
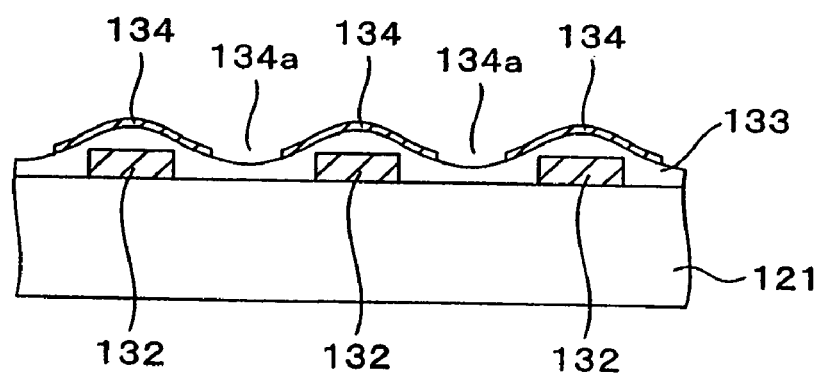
FIG. 21 is a sectional view showing an example in which opening portions for passing a light therethrough are provided in the reflective electrode.

In addition, as shown: in FIG. 21, if opening portions 134*a* are provided in the reflective electrode 134 and these opening portions 134*a* are used as light passing regions, it is feasible to construct the transmissive/reflective liquid crystal display device that can be used as the reflective liquid crystal display device in the bright surrounding environment and can be used as the transmissive liquid crystal display device in the dark surrounding environment. In order to improve a utilization efficiency of light, it is preferable that the opening portions 134*a* of the reflective electrode 134 should be formed in areas in which the linear structures 132 are not provided.

(Variation 1)

Figure 22:
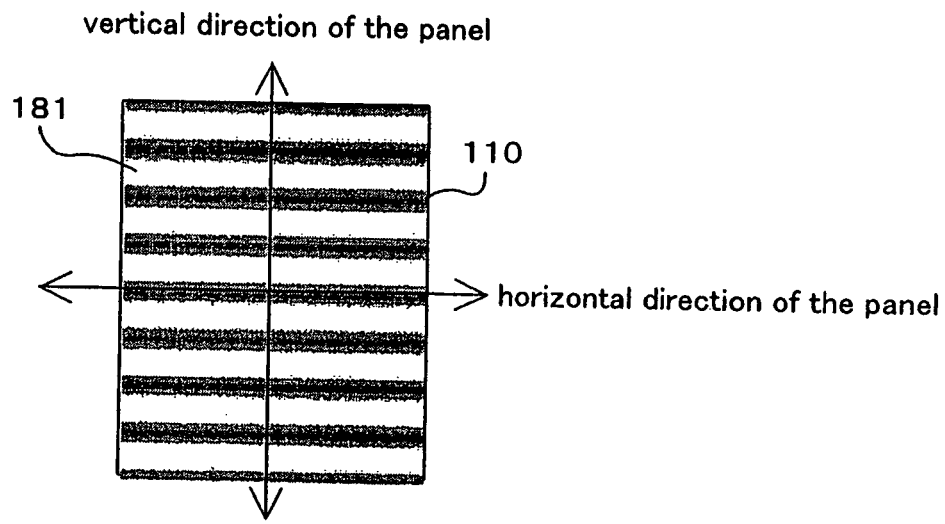
FIG. 22 is a plan view showing an example in which an extending direction of the wrinkle-like roughness is set to the horizontal direction.
Figure 23:
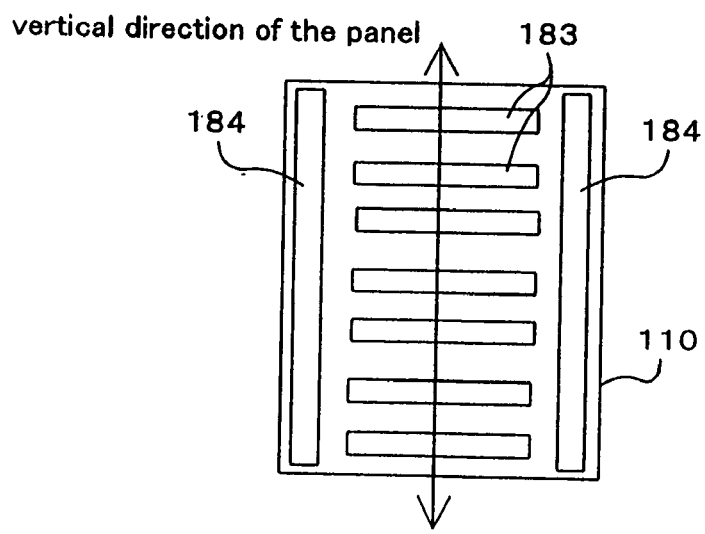
FIG. 23 is a plan view showing an example in which linear structures extending in the horizontal direction and linear structures extending in the vertical direction are provided in the picture element.

In order to maximize the distribution of existence probability of the inclination of the wrinkle-like roughness pattern to the azimuth in the vertical direction, as shown in FIG. 22, the extending direction of wrinkle-like roughness 181 in a picture element 110 must be set to the horizontal direction. For this purpose, the resist film must be largely contracted in the vertical direction at the time of annealing. As shown in FIG. 23, if linear structures 183 extending in the horizontal direction (lateral direction) of the panel are formed and also linear structures 184 extending in the vertical direction (up-and-down direction) of the panel are provided in vicinity of long sides of the picture element 110, such contraction can be effectively generated.

Figure 24:
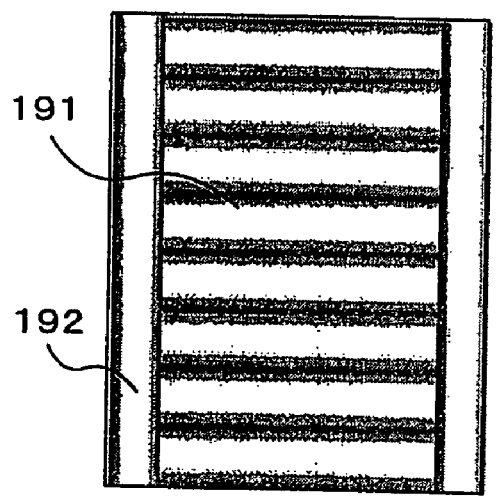
FIG. 24 is a plan view showing the wrinkle-like roughness that is formed on the surface of the reflective electrode when the structures shown in FIG. 23 are formed.

However, as shown in FIG. 24, wrinkle-like roughness 191 extending in the horizontal direction is formed near the linear structures 183, whereas wrinkle-like roughness 192 extending in the vertical direction is formed near the linear structures 184. Therefore, the azimuth of the roughness is disturbed at their intersecting portions and thus loss of the reflected light is generated.

Figure 25:
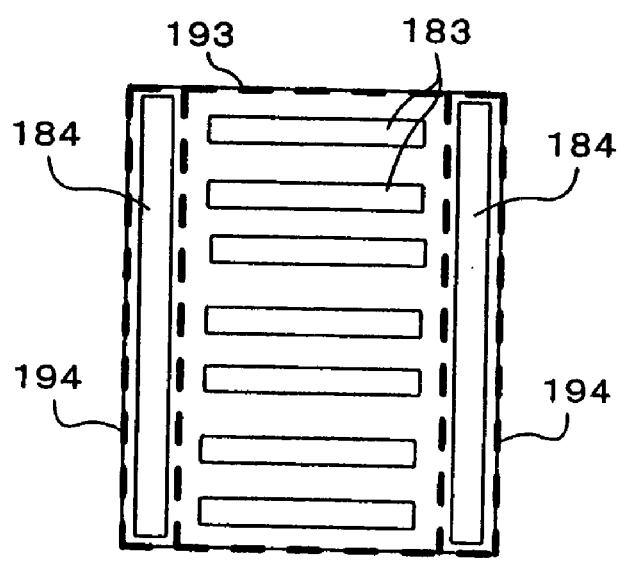
FIG. 25 is a plan view showing an example in which the linear structures extending in the horizontal direction are formed in a display area in the picture element and the linear structures extending in the vertical direction are formed in a non-display area the picture element.

As shown in FIG. 25, if the linear structures 183 extending in the horizontal direction are formed in a display area 193 of the picture element and the linear structures 184 extending in the vertical direction are formed in a non-display area (area that is shielded from the light by the black matrix, or the like) 194 of the picture element, the loss of the reflected light can be reduced.

Figure 26:
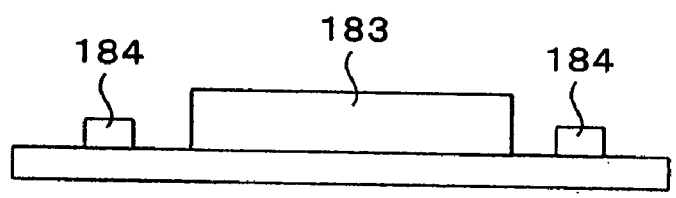
FIG. 26 is a sectional view showing an example in which the linear structures extending in the horizontal direction are formed higher than the linear structures extending in the vertical direction.

Also, as shown in FIG. 26, if a height of the linear structures 184 extending in the vertical direction is formed lower than a height of the linear structures 183 extending in the horizontal direction, the loss of the light generated at intersecting portions between the wrinkle-like roughness extending in the horizontal direction and the wrinkle-like roughness extending in the vertical direction can be reduced.

(Variation 2)

Figure 27:
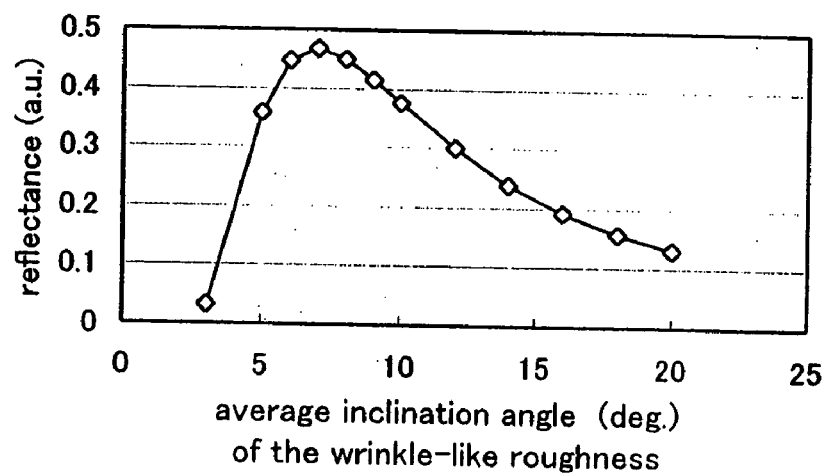
FIG. 27 is a graph showing a relationship between an average inclination angle of the wrinkle-like roughness and the reflectance.

Shown in FIG. 27 is the reflecting characteristic obtained when the reflective electrode on which the wrinkle-like roughness patterns whose average inclinations in the polar angle direction is different are formed is employed. According to FIG. 27, it is understood that if the average inclination angle of the wrinkle-like roughness on the surface of the reflective electrode is set to 5 to 15, the high reflectance can be attained. Therefore, the large improvement in the reflectance can be achieved by controlling simultaneously the polar angle direction and the azimuth direction.

Second Embodiment

Figure 28:
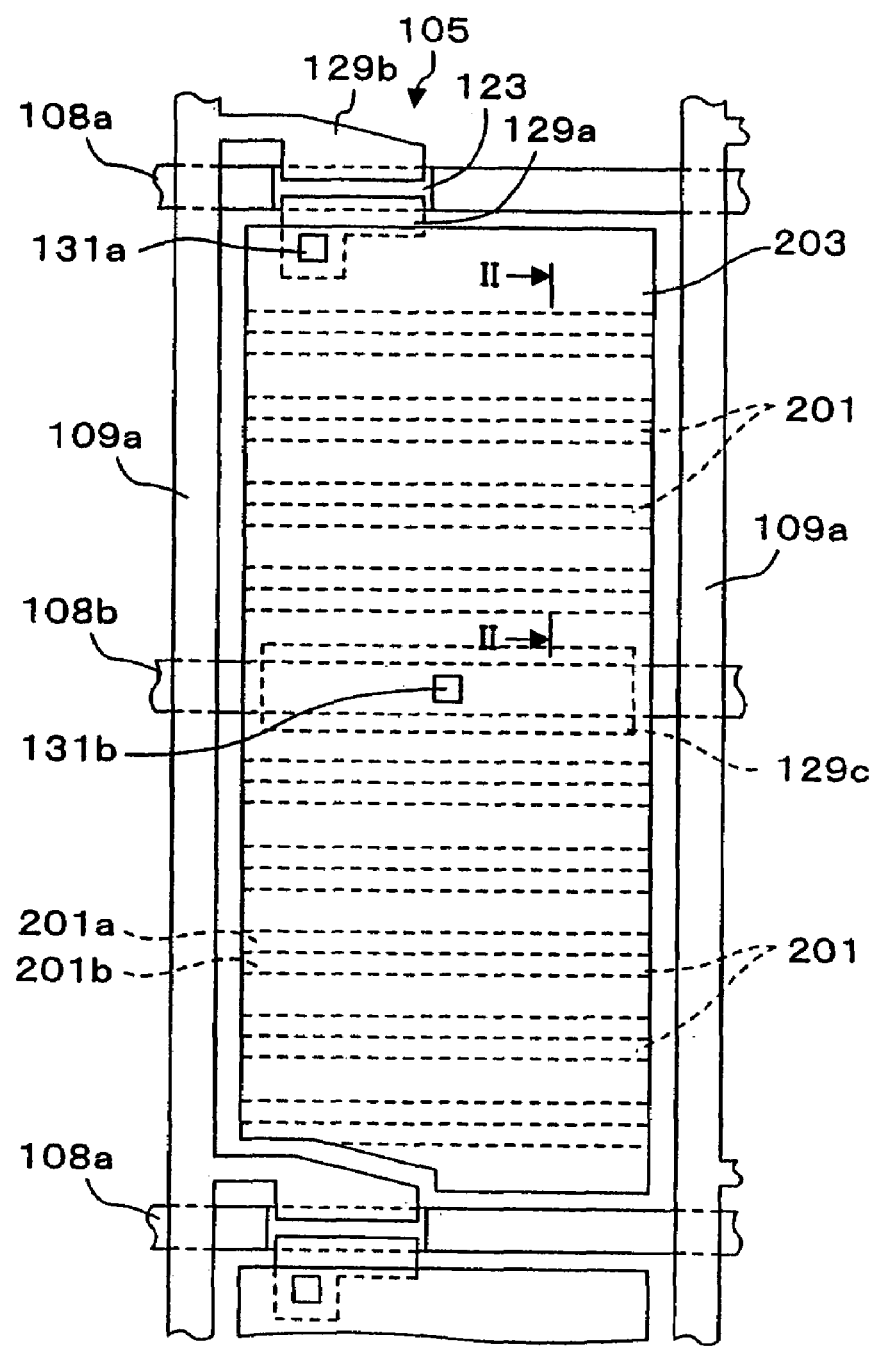
FIG. 28 is a plan view showing one picture element of a liquid crystal display device according to a second embodiment of the present invention.
Figure 29A:
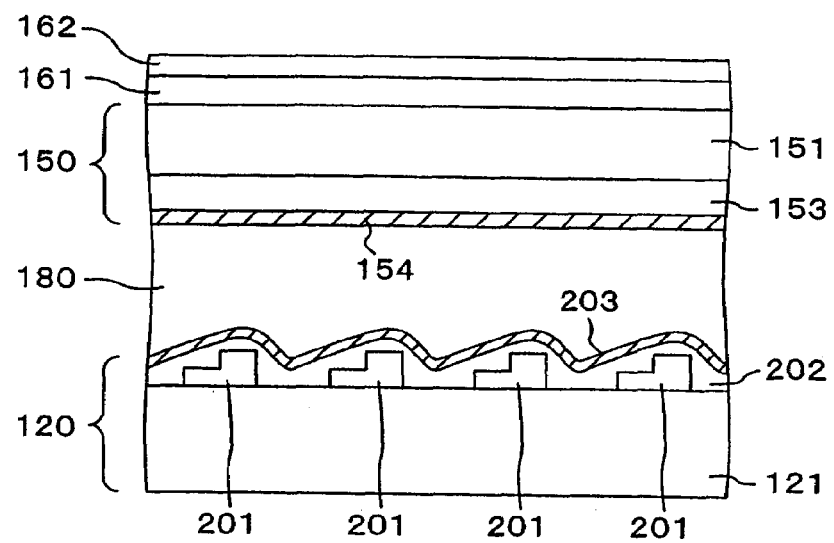
FIG. 29A is a sectional view taken along a II-II line in FIG. 28.
Figure 29B:
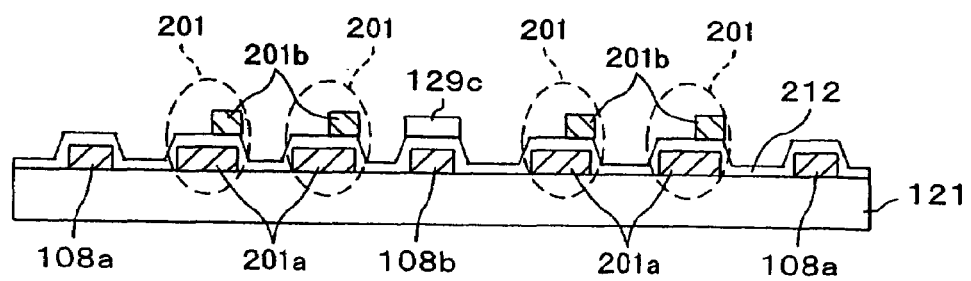
FIG. 29B is a schematic view showing a configuration of a stepwise structure in more detail.

FIG. 28 is a plan view showing one picture element of a liquid crystal display device according to a second embodiment of the present invention. FIG. 29A is a sectional view taken along a II-II line in FIG. 28, and FIG. 29B is a schematic view showing a configuration of a stepwise structure 201 in more detail. In this case, in FIG. 28 and FIGS. 29A and 29B, the same reference symbols are affixed to the same elements in FIG. 12 and FIG. 13 and their detailed explanation will be omitted hereinafter.

In the present embodiment, a plurality of structures (stepwise structures) 201 each having a stepwise sectional shape are formed on the glass substrate 121. All the stepwise structures 201 are formed in parallel with the gate bus lines 108a and are aligned in the vertical direction. In the present embodiment, the number of steps of the stepwise structures 201 is 2, and the stepwise structure 201 consists of a first pattern 201a having a large width and: a second pattern 201b formed on the first pattern 201a via a gate insulating film 212 and having a small width. In FIG. 28, the second pattern 201b is overlapped with the lower half portion of the first pattern 201a.

The stepwise structures 201 are covered with a resist film 202. Because of the presence of the stepwise structures 201, a sectional shape of the resist film 202 is formed like the blaze. Also, the wrinkle-like fine roughness extending in the almost identical direction to the stepwise structures 201 is provided on a surface of the resist film 202.

A reflective electrode 203 is formed on the resist film 202. This reflective electrode 203 is also formed like the blaze following to the resist film 202. The wrinkle-like roughness extending in the same direction as the stepwise structures 201 is provided on a surface of the reflective electrode 203.

Next, a method of manufacturing the liquid crystal display device according to the present embodiment will be explained with reference to a plan view of FIG. 28 and sectional views of FIGS. 30A to 30F hereunder.

Figure 30A:
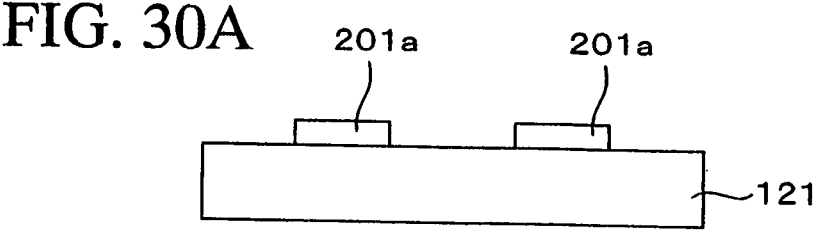
FIGS. 30A to 30F are views showing a method of manufacturing the reflective liquid crystal display device according to the second embodiment.

First, as shown in FIG. 30A, the first metal film is formed on the glass substrate 121, and then the first metal film is patterned by the photolithography method. Thus, the gate bus lines 108a, the storage capacitance bus lines 108b, and the first patterns 201a acting as the lower layer of the stepwise structures 201 are formed.

Then, the gate insulating film 212 is formed on the overall upper surface of the glass substrate 121, and the first silicon film acting as the active layer of the TFT 105 and an SiN film acting as a channel protection film 123 are formed thereon. Then, the channel protection film 123 is formed in predetermined areas over the gate bus lines 108a by patterning the SiN film by virtue of the photolithography method.

Figure 30B:
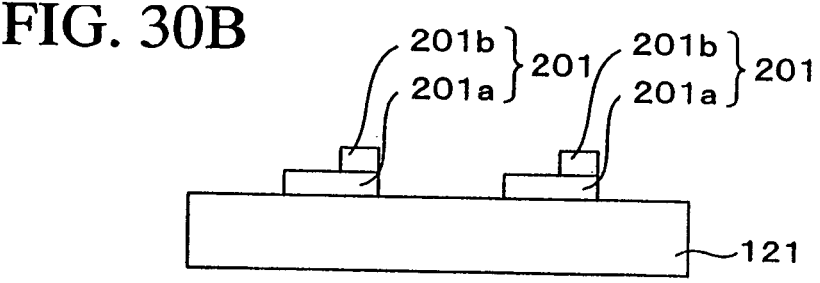

Then, the second silicon film in which the impurity is introduced at a high concentration to act as the ohmic contact layer is formed on the overall upper surface of the glass substrate 121, and then the second metal film is formed on the second silicon film. Then, the second metal film, the second silicon film, and the first silicon film are patterned by the photolithography method. Thus, the shape of the first silicon film acting as the active layer of the TFT 105 is defined and also the data bus lines 109a, the source electrodes 129a, the drain electrodes 129b, the storage capacitance electrodes 129c, and the second patterns 201b acting as the upper layers of the stepwise structures 201 are formed. In this case, as shown in FIG. 30B, the second pattern 201b is overlapped with the first pattern 201a, and is formed to have a narrower width than the first pattern 201a.

Figure 30C:
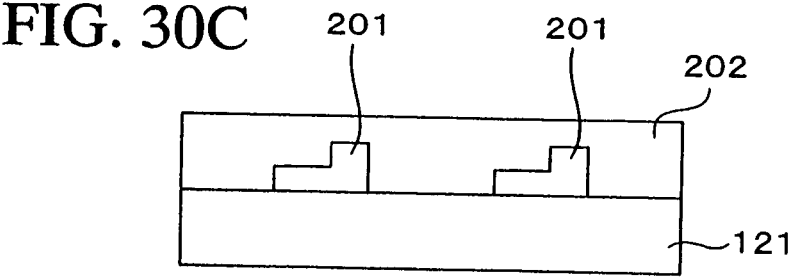

In this manner, after the stepwise structures 201 are formed by the first pattern 201a and the second pattern 201b, the SiN insulating film (not shown) is formed on the overall upper surface of the glass substrate 121. Then, opening portions from which the source electrode 129a and the storage capacitance electrode 129c are exposed are formed in the SiN insulating film. Then, as shown in FIG. 30C, the photoresist film 202 is formed by coating the positive photoresist on the overall upper surface of the glass substrate 121.

Then, the photoresist film 202 is pre-baked at the temperature of 90° C. for 30 minutes. Then, the contact holes 131a, 131b reaching the source electrode 129a and the storage capacitance electrode 129c from the surface of the photoresist film 202 via the opening portions of the SiN insulating film are formed by exposing and developing the photoresist film 202.

Figure 30D:
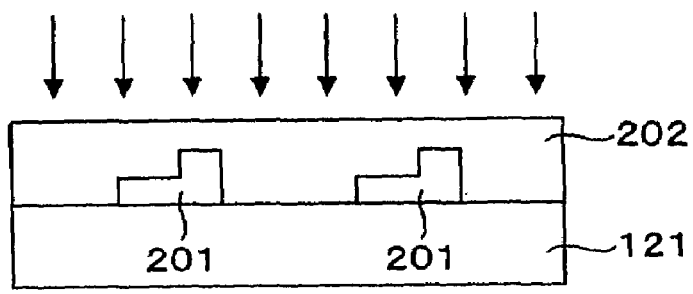

Then, the photoresist film 202 is post-baked at the temperature of 135° C. for 80 minutes. Then, as shown in FIG. 30D, the ultraviolet ray (UV) is irradiated onto the photoresist film 202 at an energy of 2600 mJ/cm². Thus, only the surface layer of the photoresist film 202 is cured.

Figure 30E:
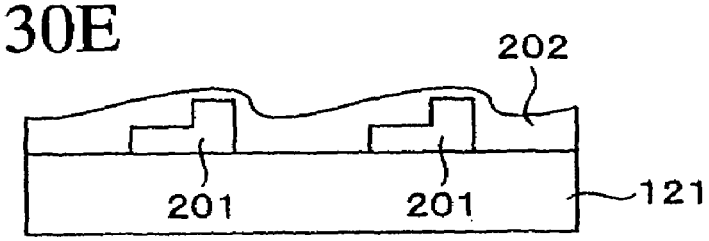

Then, the photoresist film 202 is baked at the temperature of 200° C. for 60 minutes. Thus, as shown in FIG. 30E, a sectional shape of the photoresist film 202 is formed like the blaze following the stepwise structures 201, and the wrinkle-like fine roughness is formed on the surface of the photoresist film 202. The wrinkle-like roughness extends in the almost same direction as the stepwise structures 201.

Figure 30F:
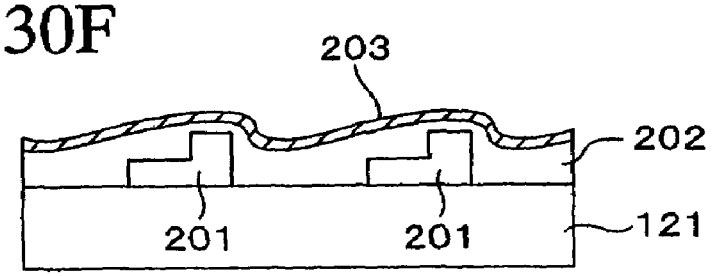

Then, as shown in FIG. 30F, an aluminum film of 2000 thickness is formed by forming an aluminum on the overall upper surface of the glass substrate 121 by means of the vacuum deposition. Then, the reflective electrode 203 is formed by patterning the aluminum film. Then, the alignment film made of polyimide, or the like is formed on the reflective electrode 203. In this manner, the TFT substrate having the reflective electrode 203, whose sectional shape is formed like the blaze and on the surface of which the wrinkle-like fine roughness is provided, is completed.

Meanwhile, like the first embodiment, the opposing substrate 150 is formed. Then, as shown in FIG. 29A, the TFT substrate 120 and the opposing substrate 150 are arranged to oppose to each other and to put spacers (not shown) therebetween, and then the liquid crystal 180 is sealed between them. Then, the phase plate 161 and the polarization plate 162 are arranged on the opposing substrate 150. The liquid crystal display device of the present embodiment is completed in this manner.

Next, examined results of the reflecting characteristic of the reflective electrode formed by the above-mentioned method will be explained hereunder. In this case, since it is intended simply to examine the reflective characteristic, the stepwise structures were formed directly on the substrate, then the resist film for covering the stepwise structures was formed, and then the reflective electrode was formed thereon.

Figure 31:
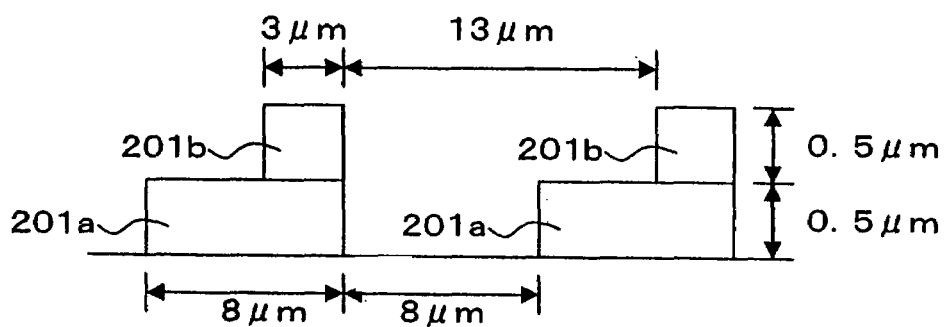
FIG. 31 is a schematic view showing an example of first and second pattern sizes constituting the stepwise structure.
Figure 32:
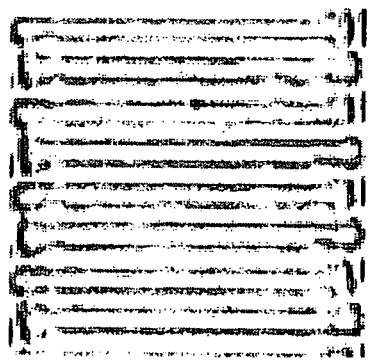
FIG. 32 is a view showing a microphotographic picture (of 20 magnifications) of the surface of the reflective electrode formed by the method in the second embodiment.

As shown in FIG. 31, a width of the first pattern 201a was set to 8 µm, a pitch was set to 8 µm, and a height was set to 0.5 µm. A width of the second pattern 201b was set to 3 µm, and a height was set to 0.5 µm. Then, the resist film, having the wrinkle-like roughness on its surface is formed by the above method, and the reflective electrode is formed by depositing the aluminum thereon. A microphotographic picture (of 20 magnifications) of the surface of the reflective electrode formed in this way is shown in FIG. 32.

Figure 33:
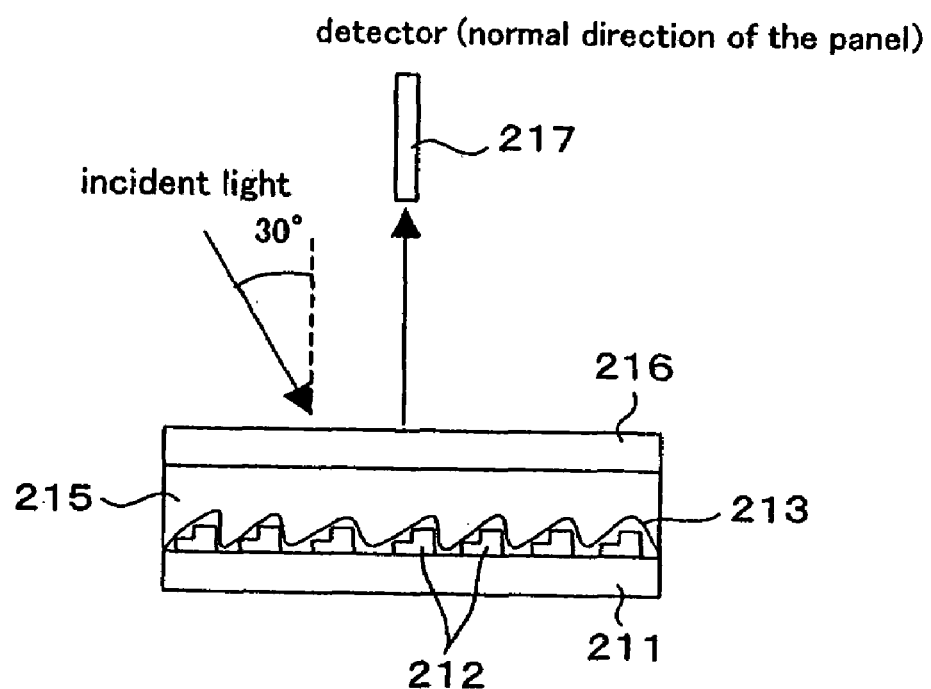
FIG. 33 is a schematic view showing a method of measuring the reflectance and the contrast.

Then, the reflecting characteristic of the reflective electrode was examined. As shown in FIG. 33, the panel of Example was prepared by sealing an immersion oil 215, whose refractive index is 1.5, between one substrate 211, on which the stepwise structures 212 and a reflective electrode 213 are formed, and the other substrate 216. Then, the light was irradiated along the direction at angle of 30 to a normal line of the panel, and then the reflectance was measured by a detector 217 positioned in the normal direction of the panel. Also, the panel in Comparative Example was prepared by the similar way to Example except that no stepwise structure was formed, and the reflectance was measured. In this case, a reflection intensity obtained when the standard white board is used as a reflection board was assumed as 100%, and then the reflectance was evaluated as the relative value with respect to the standard white board.

As a result, the reflectance of 181.2% was derived in the panel in Comparative Example in which no stepwise structure is provided, while the reflectance of 353.2%, i.e. about twice brightness, was derived in the panel in Example.

The reason why the panel in the present example becomes brighter than the panel in Comparative Example may be considered as follows. That is, since the fine roughness is provided on the display surface of the reflecting board, the light incident on the reflecting board is reflected as the diffused reflection, nevertheless the specular reflection direction becomes a center of the intensity distribution and then the reflection intensity becomes lower as an angle is deviated from the specular reflection direction.

Figure 34A:
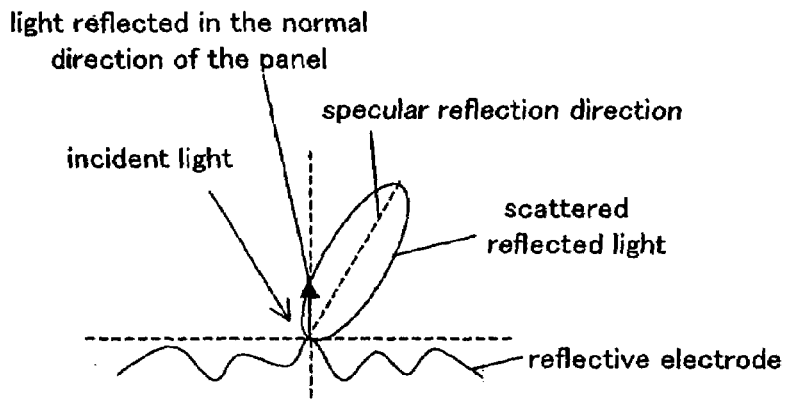
FIG. 34A is a schematic view showing an intensity of a light reflected by the wrinkle-like roughness on the surface of the reflective electrode, which is not formed like the blaze, in the normal direction of the panel.

Assuming that the user's eye is present in the normal direction of the panel, if no stepwise structure is provided, only a weak reflected light can be provided in the normal direction of the panel when, as shown in FIG. 34A, for example, the light is incident from the oblique direction to the normal of the panel.

Figure 34B:
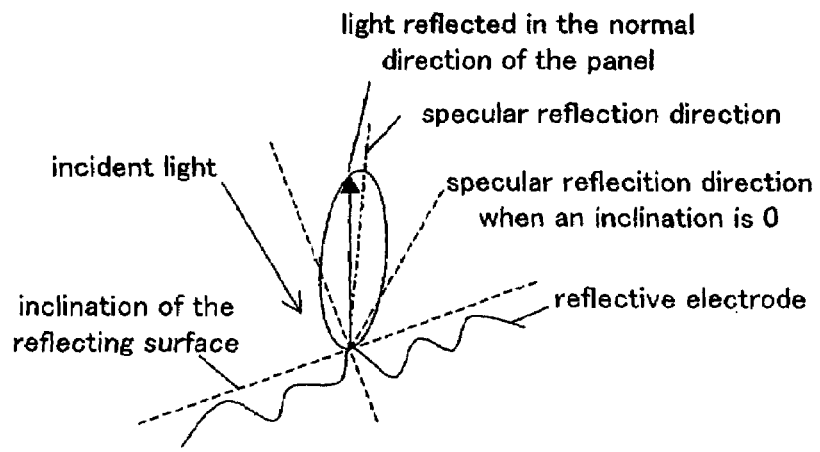
FIG. 34B is a schematic view showing the intensity of the light reflected by the wrinkle-like roughness on the surface of the reflective electrode, which is formed like the blaze, in the normal direction of the panel.

In contrast, if the stepwise structures are provided, a strong reflected light can be provided in the normal direction of the panel since, as shown in FIG. 34B, the specular reflection direction is shifted by an inclination of the reflecting surface of the reflective electrode. In general, it is considered that, with regard to the using situation of the reflective liquid crystal display device, the light source (the sunlight or the electric lamp light) may be positioned over the panel. In order to effectively utilize the light emitted from this light source, the light must be reflected in the normal direction of the panel in view of the inclination of the panel in use. To this end, the stepwise structures may be formed to incline the reflecting surface of the reflective electrode, as explained in the present embodiment.

In the present embodiment, either the horizontal alignment liquid crystal (p type liquid crystal) or the vertical alignment liquid crystal (n type liquid crystal) may be employed. However, if the vertical alignment liquid crystal is employed, the better display characteristic is obtained particularly. The TN liquid crystal display device using the horizontal alignment liquid crystal and the VA liquid crystal display device using the vertical alignment liquid crystal were manufactured. Then, examined results of their display characteristics will be explained hereunder.

The stepwise structures and the reflective electrode were formed on one substrate by the above-mentioned method. Then, one substrate and the other substrate were arranged to oppose to each other, and then the vertical alignment liquid crystal was sealed between them, thereby the VA liquid crystal display was formed. The refractive anisotropy $\Delta n$ of the vertical alignment liquid crystal is 0.1 ($\Delta n=0.1$) and the twist angle is 0 The spacers whose diameter is 3 µm were used to control a cell thickness.

In similar fashion, the TN liquid crystal display panel in which the horizontal alignment liquid crystal is sealed between a pair of substrates was manufactured. The refractive anisotropy $\Delta n$ of the horizontal alignment liquid crystal is 0.07 ($\Delta n=0.07$) and the twist angle is 70. The spacers whose diameter is 3 µm were used to control a cell thickness.

Figure 35:
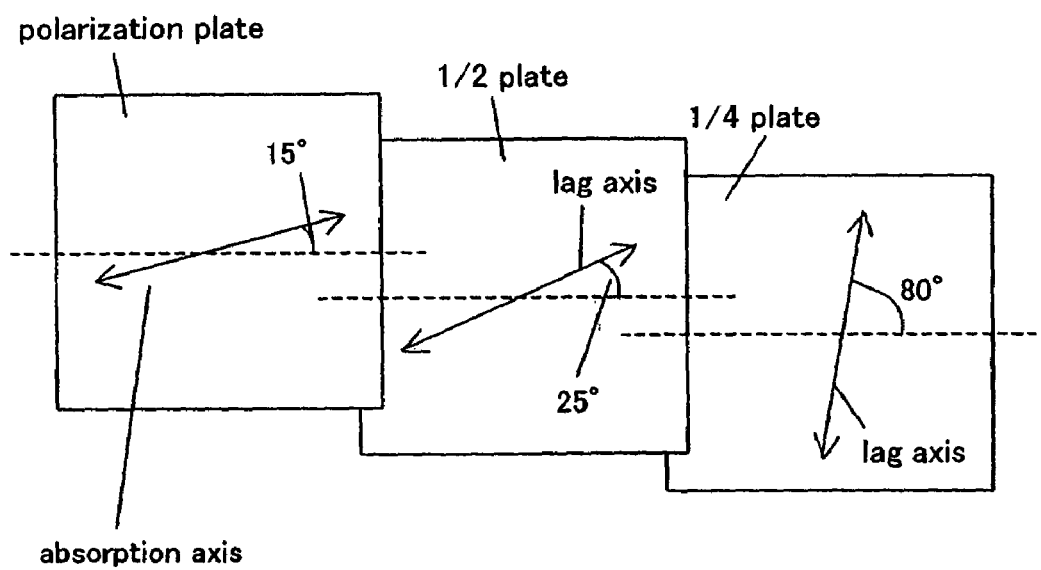
FIG. 35 is a schematic view showing arrangement states of the phase plate and the polarization plate.

On the liquid crystal display panel, the ½ plate and the ¼ plate (manufactured by Sumitomo Chemical Co., Ltd.) made of Arton and the polarization plate (G1220DU: manufactured by Nitto Denko Corporation) were arranged to have their axial angles shown in FIG. 35. Then, the reflectance and the contrast of the panels were measured by the method shown in. FIG. 33; As a result, in the TN liquid crystal display device using the horizontal alignment liquid crystal, the reflectance was 58.3% and the contrast was 14.2. In contrast, in the VA liquid crystal display device using the vertical alignment liquid crystal, the reflectance was 57.9% and the contrast was 68.8. Both display devices had the substantially equal reflectance, but the VA liquid crystal display device using the vertical alignment liquid crystal was very excellent in the contrast. According to this, it is appreciated that, if the present invention is applied to the VA liquid crystal display device, the bright image with good contrast can be displayed.

In the present embodiment, the case where the stepwise structures are formed by the metal film is explained. But the stepwise structures may be formed by the photoresist film.

(Variation 1)

Figure 36:
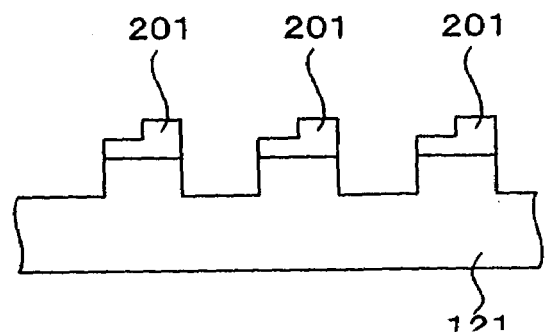
FIG. 36 is a sectional view showing an example in which the groove is formed between the stepwise structures.

FIG. 36 is a schematic view showing a variation 1 of the second embodiment. It is preferable that, in order to improve the controllability of the wrinkle-like roughness pattern, a height of the stepwise structures should be set higher.

For example, a substantial height of the stepwise structures 201 can be increased by etching the areas between the stepwise structures 201 on the glass substrate 121.

(Variation 2)

Figure 37:
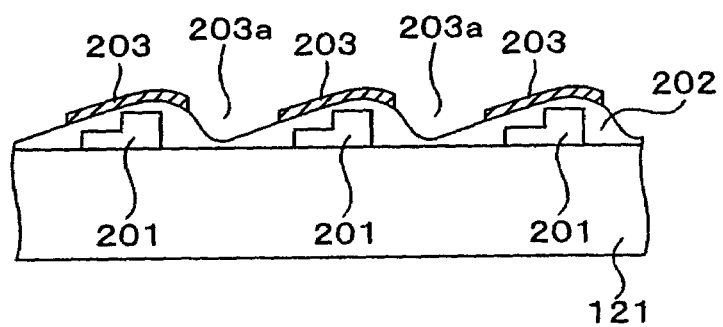
FIG. 37 is a sectional view showing an example in which the opening portions for passing a light therethrough are provided in the reflective electrode.

FIG. 37 is a schematic view showing a variation 2 of the second embodiment. In the present embodiment, a light that is incident from the back surface side of the panel is passed through by providing opening portions 203a in the reflective electrode 203. In this case, the polarization plate and the backlight are arranged on the back surface side of the panel. According to this, this display device can be used as the reflective liquid crystal display device in the bright surrounding environment, while this display device can be used as the transmissive liquid crystal display device in the dark surrounding environment by turning ON the backlight.

In this case, It is preferable that, in order to improve a utilization efficiency of light, the opening portions 203a in the reflective electrode 203 should be formed in the areas in which the stepwise projections 201 are not formed.

As explained above, according to the present invention, the linear structures, the structures shaped by combining plural straight lines, or the stepwise structures are formed on the substrate, and then the wrinkle-like roughness pattern formed on the surface of the reflective electrode is controlled by the structures. Therefore, the bright liquid crystal display device with excellent contrast can be implemented by utilizing effectively the light incident from the upper side.

What is claimed is:

1. A method of manufacturing a liquid crystal display device comprising the steps of:
    forming a gate bus line, a data bus line, and a thin film transistor connected to the gate bus line and the data bus line on a first substrate respectively;
    forming a photoresist film on an overall upper surface of the first substrate;
    curing only a surface layer of the photoresist film;
    forming a wrinkle-like roughness on a surface of the photoresist film by applying an annealing;
    forming a reflective electrode, which is connected to the thin film transistor, on the photoresist film; and
    arranging a second substrate to oppose to the first substrate, and sealing a liquid crystal between the first substrate and the second substrate;
    wherein a structure having a linear shape or a shape formed by combining a plurality of straight lines is formed simultaneously with any one of the gate bus line and the data bus line.

2. A method of manufacturing a liquid crystal display device comprising the steps of:
    forming a gate bus line, a data bus line, a thin film transistor connected to the gate bus line and the data bus line, and a stepwise structure having a stepwise cross section on a first substrate respectively;
    forming a photoresist film on an overall upper surface of the first substrate;
    curing only a surface layer of the photoresist film;
    forming a wrinkle-like roughness on a surface of the photoresist film by applying an annealing;
    forming a reflective electrode on the photoresist film; and
    arranging a second substrate to oppose to the first substrate, and sealing a liquid crystal between the first substrate and the second substrate;
    wherein at least a part of the stepwise structure is formed simultaneously with at least one of the gate bus line and the data bus line.

3. A method of manufacturing a liquid crystal display device according to claim 2, wherein the stepwise structure is formed by the photoresist.

4. A method of manufacturing a liquid crystal display device comprising the steps of:
    forming a first conductor film on a first substrate, and then forming a gate bus line and a first pattern by patterning the first conductor film;
    forming a first insulating film on an overall upper surface of the first substrate;
    forming a semiconductor film acting as an active layer of a thin film transistor on the first insulating film;
    forming a second conductor film on the first insulating film, and then forming a source electrode and a drain electrode of the thin film transistor, a data bus line connected to the drain electrode, and a second pattern having a width narrower than the first pattern and formed to overlap with the first pattern by patterning the second conductor film;
    forming a second insulating film on an overall upper surface of the first substrate;
    forming a photoresist film on the second insulating film;
    curing only a surface layer of the photoresist film;
    forming a wrinkle-like roughness on a surface of the photoresist film by applying an annealing;
    forming a reflective electrode on the photoresist film; and
    arranging a second substrate to oppose to the first substrate, and then sealing a liquid crystal between the first substrate and the second substrate.

* * * * *

UNITED STATES PATENT AND TRADEMARK OFFICE
CERTIFICATE OF CORRECTION

| | | |
|---|---|---|
| PATENT NO. | : 7,453,548 B2 | Page 1 of 1 |
| APPLICATION NO. | : 11/471032 | |
| DATED | : November 18, 2008 | |
| INVENTOR(S) | : Sugiura et al. | |

It is certified that error appears in the above-identified patent and that said Letters Patent is hereby corrected as shown below:

<u>Title page</u>

Item (30) should read --Foreign Application Priority Data: JP 2002-365100; 12/17/02--.

Signed and Sealed this

Eleventh Day of May, 2010

David J. Kappos
*Director of the United States Patent and Trademark Office*